United States Patent
Ono et al.

(10) Patent No.: US 11,575,293 B2
(45) Date of Patent: Feb. 7, 2023

(54) ELECTRIC MOTOR AND TURBO-COMPRESSOR

(71) Applicant: DAIKIN INDUSTRIES, LTD., Osaka (JP)

(72) Inventors: Takaaki Ono, Osaka (JP); Yusuke Irino, Osaka (JP); Tatsuya Tonari, Osaka (JP); Yuji Nakazawa, Osaka (JP); Keiji Aota, Osaka (JP); Atsushi Sakawaki, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 191 days.

(21) Appl. No.: 16/760,691

(22) PCT Filed: Oct. 25, 2018

(86) PCT No.: PCT/JP2018/039722
§ 371 (c)(1),
(2) Date: Apr. 30, 2020

(87) PCT Pub. No.: WO2019/087935
PCT Pub. Date: May 9, 2019

(65) Prior Publication Data
US 2020/0350804 A1 Nov. 5, 2020

(30) Foreign Application Priority Data
Oct. 31, 2017 (JP) .............................. JP2017-210742

(51) Int. Cl.
*H02K 7/09* (2006.01)
*F02B 39/10* (2006.01)
(Continued)

(52) U.S. Cl.
CPC ............... *H02K 7/09* (2013.01); *F02B 39/10* (2013.01); *F16C 32/0406* (2013.01); *H02K 3/12* (2013.01);
(Continued)

(58) Field of Classification Search
CPC .. H02K 7/09; H02K 3/12; H02K 3/28; H02K 7/083; H02K 2205/03; H02K 2213/03;
(Continued)

(56) References Cited

U.S. PATENT DOCUMENTS 6,265,801 B1 * 7/2001 Hashiba ................. H02K 9/225
310/156.28
7,977,840 B2 * 7/2011 Chu ......................... H02K 3/14
29/605
(Continued)

FOREIGN PATENT DOCUMENTS

JP 2008-178165 A 7/2008
JP 2011-24385 A 2/2011
(Continued)

OTHER PUBLICATIONS

European Search Report of corresponding EP Application No. 18 87 4918.8 dated Mar. 12, 2021.
(Continued)

*Primary Examiner* — John K Kim
(74) *Attorney, Agent, or Firm* — Global IP Counselors, LLP

(57) ABSTRACT

The stator includes a stator core, a support electric wire formed by one or more conductive wires, and a drive electric wire formed by one or more conductive wires. The stator core includes an annular shaped back yoke and a plurality of teeth on an inner periphery of the back yoke. The support electric wire is disposed so as to pass through a plurality of slots respectively formed between the teeth, and forms a winding portion that generates an electromagnetic force for supporting the rotor in a non-contact manner by being energized. The drive electric wire is disposed so as to pass through the plurality of slots, and forms a winding portion that generates an electromagnetic force for rotating the rotor by being energized. A cross-sectional area per conductive
(Continued)

wire of the support electric wire differs from a cross-sectional area per conductive wire of the drive electric wire.

22 Claims, 13 Drawing Sheets

(51) Int. Cl.
   *F16C 32/04* (2006.01)
   *H02K 3/12* (2006.01)
   *H02K 3/28* (2006.01)
(52) U.S. Cl.
   CPC ............ *H02K 3/28* (2013.01); *F05D 2220/40* (2013.01); *F05D 2240/511* (2013.01)
(58) Field of Classification Search
   CPC .......... H02K 16/00; H02K 7/01; F02B 39/10; F16C 32/0406; F16C 32/04; F05D 2220/40; F05D 2240/511
   USPC .......................................................... 310/198
   See application file for complete search history.

(56) References Cited

U.S. PATENT DOCUMENTS

| | | | | |
|---|---|---|---|---|
| 8,154,166 | B2* | 4/2012 | Tang | H02K 15/085 310/198 |
| 2002/0093263 | A1* | 7/2002 | Amrhein | F16C 32/0493 310/90.5 |
| 2008/0185933 | A1* | 8/2008 | Baba | H02K 3/28 310/198 |
| 2010/0090557 | A1* | 4/2010 | El-Refaie | H02K 21/22 310/198 |
| 2012/0299422 | A1* | 11/2012 | Filatov | H02K 7/09 310/90.5 |
| 2015/0233422 | A1 | 8/2015 | Irino et al. | |
| 2017/0133968 | A1* | 5/2017 | Takahashi | H02K 3/345 |
| 2017/0234364 | A1* | 8/2017 | Sakawaki | F16C 32/0451 310/90.5 |
| 2020/0350804 | A1* | 11/2020 | Ono | H02K 3/12 |

FOREIGN PATENT DOCUMENTS

| | | |
|---|---|---|
| WO | 98/59407 A1 | 12/1998 |
| WO | 2014/041752 A1 | 3/2014 |

OTHER PUBLICATIONS

International Search Report of corresponding PCT Application No. PCT/JP2018/039722 dated Jan. 22, 2019.
International Preliminary Report of corresponding PCT Application No. PCT/JP2018/039722 dated May 14, 2020.

* cited by examiner

FIG.5
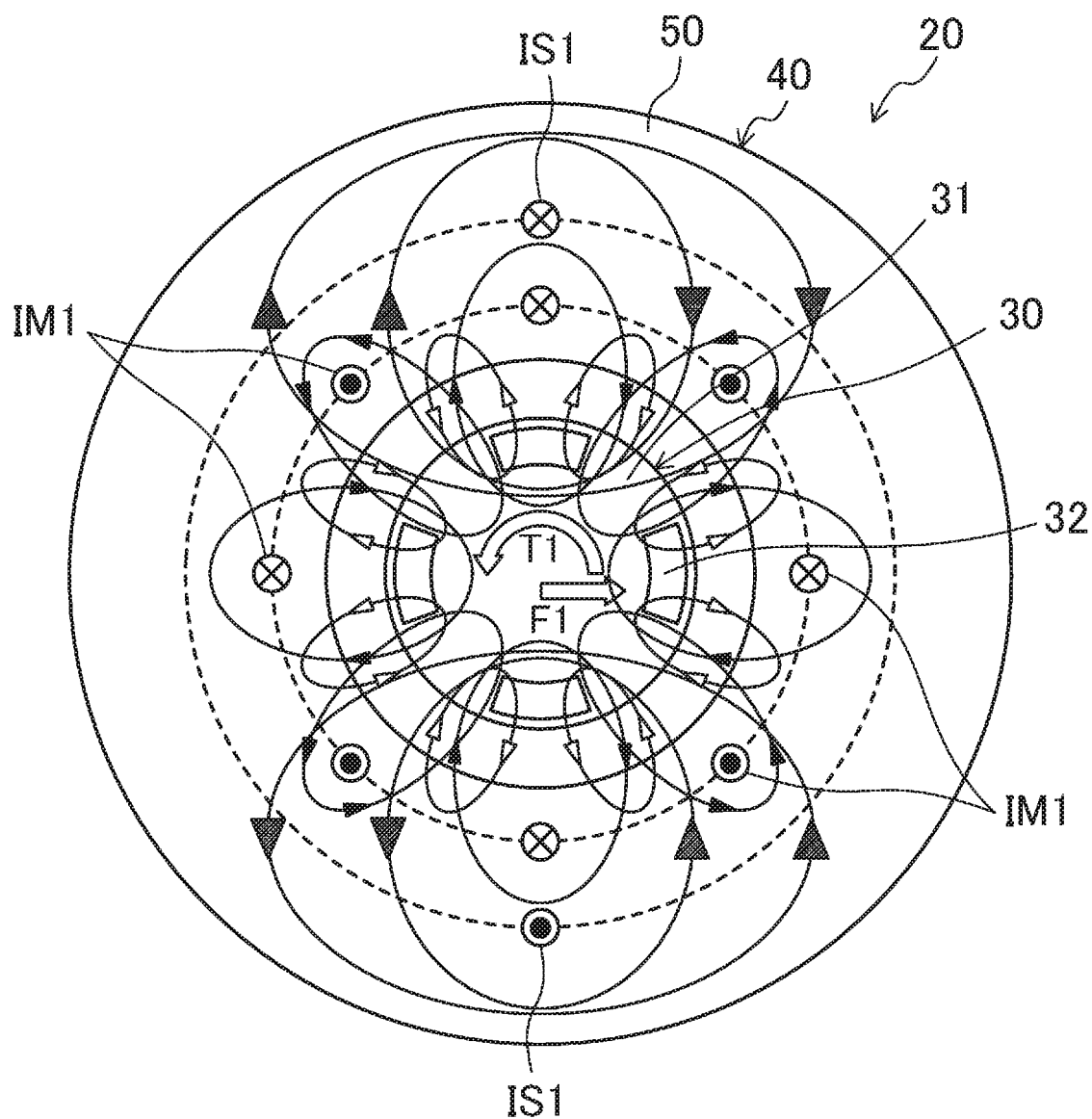
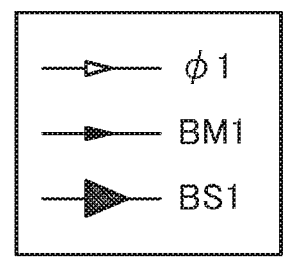

ELECTRIC MOTOR AND
TURBO-COMPRESSOR

CROSS-REFERENCE TO RELATED
APPLICATIONS

This U.S. National stage application claims priority under 35 U.S.C. § 119(a) to Japanese Patent Application No. 2017-210742, filed in Japan on Oct. 31, 2017, the entire contents of which are hereby incorporated herein by reference.

BACKGROUND

Field of the Invention

The present disclosure relates to an electric motor and a turbo-compressor.

BACKGROUND Information

To date, an electric motor (so-called bearingless motor) that has a function of supporting a drive shaft in a non-contact manner and a function of rotating the drive shaft is known. For example, Japanese Unexamined Patent Application Publication No. 2008-178165 describes a bearingless motor including: multiple-pole motor windings that are disposed in a stator; and a plurality of magnetic support windings that are independent from the motor windings and differ in number from the motor windings.

SUMMARY

Technical Problem

In a bearingless motor (electric motor), such as the one described in Japanese Unexamined Patent Application Publication No. 2008-178165, a support electric wire, which forms a winding portion that generates an electromagnetic force (supporting force) for supporting a drive shaft in a non-contact manner, and a drive electric wire, which forms a winding portion that generates an electromagnetic force (driving force) for rotating the drive shaft, are disposed so as to pass through a plurality of slots respectively formed between a plurality of teeth. It is conceivable that such an electric motor can be manufactured by: configuring the support electric wire and the drive electric wire by using common conductive wires, and adjusting the number of conductive wires of the support electric wire and the number of conductive wires of the drive electric wire in accordance with space factors (the ratio of the sum of the cross-sectional areas of conductive wires that pass through a slot to the cross-sectional area of the slot) that are respectively required for the support electric wire and the drive electric wire. However, when configuring, the support electric wire and the drive electric wire by using common conductive wires, it is difficult to improve the degree of freedom in design of the electric wires while obtaining space tors required for the electric wires.

An object of the present disclosure is to provide an electric motor that can improve the degree of freedom in design of electric wires while obtaining space factors required for the electric wires.

According to a first aspect of the present disclosure, an electric motor includes a rotor (30) and a stator (40). The stator (40) includes a stator core (50) that includes a back yoke (51) having an annular shape and a plurality of teeth (52) provided on an inner periphery of the back yoke (51); a support electric wire (60) that is constituted by one or more conductive wires (61), that is disposed so as to pass through a plurality of slots (53) respectively formed between the plurality of teeth (52), and that forms a winding portion that generates an electromagnetic force for supporting the rotor (30) in a non-contact manner by being energized; and a drive electric wire (70) that is constituted by one or more conductive wires (71), that is disposed so as to pass through the plurality of slots (53), and that forms a winding portion that generates an electromagnetic force for rotating the rotor (30) by being energized. Across-sectional area per conductive wire (61) of the support electric wire (60) differs from a cross-sectional area per conductive wire (71) of the drive electric wire (70).

With the first aspect, while improving the space factor of one of the support electric wire (60) and the drive electric wire (70) (that is, the ratio of the sum of the cross-sectional areas of the conductive wires thereof that pass through the slot (53) to the cross-sectional area of the slot (53)), it is possible to reduce the allowable bend radius of the other of the support electric wire (60) and the drive electric wire (70). Thus, it is possible to improve the degree of freedom in design of electric wires while obtaining space factors required for the electric wires.

According to a second aspect of the present disclosure, in the first aspect, the cross-sectional area per conductive wire of one of the support electric wire (60) and the drive electric wire (70) for which a ratio of a sum of cross-sectional areas of the conductive wires thereof that pass through each of the slots (53) to a cross-sectional area of the slot (53) is lower is smaller than the cross-sectional area per conductive wire of the other of the support electric wire (60) and the drive electric wire (70) for which a ratio of a sum of cross-sectional areas of the conductive wires thereof that pass through the slot (53) to the cross-sectional area of the slot (53) is higher.

With the second aspect, it is possible to increase the space factor of the other of the support electric wire (60) and the drive electric wire (70) whose space factor in the slot (53) (that is, the ratio of the sum of the cross-sectional areas of the conductive wires thereof that pass through the slot (53) to the cross-sectional area of the slot (53)) is higher. Thus, it is possible to effectively improve the space factors of the electric wires in the slot (53) (the sum of the space factor of the support electric wire (60) and the space factor of the drive electric wire (70)).

According to a third aspect of the present disclosure, in the first aspect, the cross-sectional area per conductive wire of one of the support electric wire (60) and the drive electric wire (70) that includes a larger number of conductive wires that pass through each of the slots (53) is smaller than the cross-sectional area per conductive wire of the other of the support electric wire (60) and the drive electric wire (70) that includes a smaller number of conductive wires that pass through the slot (53).

With the third aspect, it is possible to reduce the allowable bend radius of the one of the support electric wire (60) and the drive electric wire (70) that includes a larger number of conductive wires that pass through the slot (53). Thus, it is easy to reduce the size of the coil end portion of the electric motor (a portion constituted by the coil end portion of the support electric wire (60) and the coil end portion of the drive electric wire (70)).

According to a fourth aspect of the present disclosure, in the first aspect, the cross-sectional area per conductive wire of one of the support electric wire (60) and the drive electric wire (70) for which a sum of cross-sectional areas of the conductive wires thereof is smaller is smaller than the cross-sectional area per conductive wire of the other of the support electric wire (60) and the drive electric wire (70) for which a sum of cross-sectional areas of the conductive wires thereof is larger.

With the fourth aspect, it is possible to increase the space factor of the other of the support electric wire (60) and the drive electric wire (70) for which the sum of the cross-sectional areas of the conductive wires thereof is larger. Thus, it is possible to effectively improve the space factors of the electric wires in the slot (53) (the sum of the space factor of the support electric wire (60) and the space factor of the drive electric wire (70)).

According to a fifth aspect of the present disclosure, in the first aspect, the cross-sectional area per conductive wire of one of the support electric wire (60) and the drive electric wire (70) that includes a larger number of electric wires that pass through each of the slots (53) is smaller than the cross-sectional area per conductive wire of the other of the support electric wire (60) and the drive electric wire (70) that includes a smaller number of electric wires that pass through the slot (53).

With the fifth aspect, it is possible to reduce the allowable bend radius of the one of the support electric wire (60) and the drive electric wire (70) that includes a larger number of conductive wires that pass through the slot (53) (one of the electric wires whose coil end portion tends to become large). Thus, it is easy to reduce the size of the coil end portion of the electric motor (a portion constituted by the coil end portion of the support electric wire (60) and the coil end portion of the drive electric wire (70)).

According to a sixth aspect of the present disclosure, in any one of the first to fifth aspects, the cross-sectional area per conductive wire (61) of the support electric wire (60) is smaller than the cross-sectional area per conductive wire (71) of the drive electric wire (70).

With the sixth aspect, it is possible to reduce the allowable bend radius of the support electric wire (60) while effectively improving the space factor of the drive electric wire (70). By improving the space factor of the drive electric wire (70), it is possible to increase an electromagnetic force (an electromagnetic force for rotating the rotor (30)) that is generated when the drive electric wire (70) is energized, and, as a result, it is possible to increase the torque of the rotor (30). Accordingly, by effectively improving the space factor of the drive electric wire (70), it is easy to obtain an electromagnetic force required to rotate the rotor (30).

According to a seventh aspect of the present disclosure, in any one of the first to sixth aspects, a part or an entirety of a coil end portion of one of the support electric wire (60) and the drive electric wire (70) whose cross-sectional area per conductive wire is smaller is covered by a part or an entirety of a coil end portion of the other of the support electric wire (60) and the drive electric wire (70) whose cross-sectional area per conductive wire is larger.

With the seventh aspect, it is possible to dispose the coil end portion of the one of the support electric wire (60) and the drive electric wire (70) whose cross-sectional area per conductive wire is smaller (the electric wire whose allowable bend radius is smaller) in a dead space between the coil end portion of the other of the support electric wire (60) and the drive electric wire (70) whose cross-sectional area per conductive wire is larger (the electric wire whose allowable bend radius is larger) and the stator core (50). Thus, it is easy to reduce the size of the coil end portion of the electric motor (a portion constituted by the coil end portion of the support electric wire (60) and coil end portion of the drive electric wire (70)).

According to an eighth aspect of the present disclosure, in the seventh aspect, the other of the support electric wire (60) and the drive electric wire (70) whose cross-sectional area per conductive wire is larger is constituted by a segment coil (80).

With the eighth aspect, it is easy to attach the other of the support electric wire (60) and the drive electric wire (70) whose cross-sectional area per conductive wire is larger.

According to a ninth aspect of the present disclosure, in any one of the first to eighth aspects, the support electric wire (60) and the drive electric wire (70) are disposed adjacent to each other in a circumferential direction of the stator (40).

According to a tenth aspect of the present disclosure, in the ninth aspect, the support electric wire (60) and the drive electric wire (70) are disposed in such a way that a part or an entirety of one of the support electric wire (60) and the drive electric wire (70) whose cross-sectional area per conductive wire is smaller is covered by a part or an entirety of the other of the support electric wire (60) and the drive electric wire (70) whose cross-sectional area per conductive wire is larger.

With the tenth aspect, it is possible to dispose the one of the support electric wire (60) and the drive electric wire (70) whose cross-sectional area per conductive wire is smaller (the electric wire whose allowable bend radius is smaller), in a dead space between the other of the support electric wire (60) and the drive electric wire (70) whose cross-sectional area per conductive wire is larger (the electric wire whose allowable bend radius is larger) and the teeth (52). Thus, it is easy to reduce the size of the coil end portion of the electric motor (a portion constituted by the coil end portion of the support electric wire (60) and coil end portion of the drive electric wire (70)).

According to an eleventh aspect of the present disclosure, a turbo-compressor includes the electric motor according to any one of the first to tenth aspects, a drive shaft (12) rotated by the electric motor, and an impeller (13) coupled to the drive shaft (12).

With the eleventh aspect, it is possible to improve the degree of freedom in design of electric wires while obtaining space factors required for the electric wires in the electric motor.

Advantageous Effects of Invention

With the present disclosure, it is possible to improve the degree of freedom in design of electric wires while obtaining space factors required for the electric wires.

BRIEF DESCRIPTION OF DRAWINGS

FIG. 5 is a cross-sectional view illustrating examples of magnet magnetic flux, drive magnetic flux, and support magnetic flux generated in the bearingless motor.

DETAILED DESCRIPTION OF EMBODIMENTS

Figure 1:
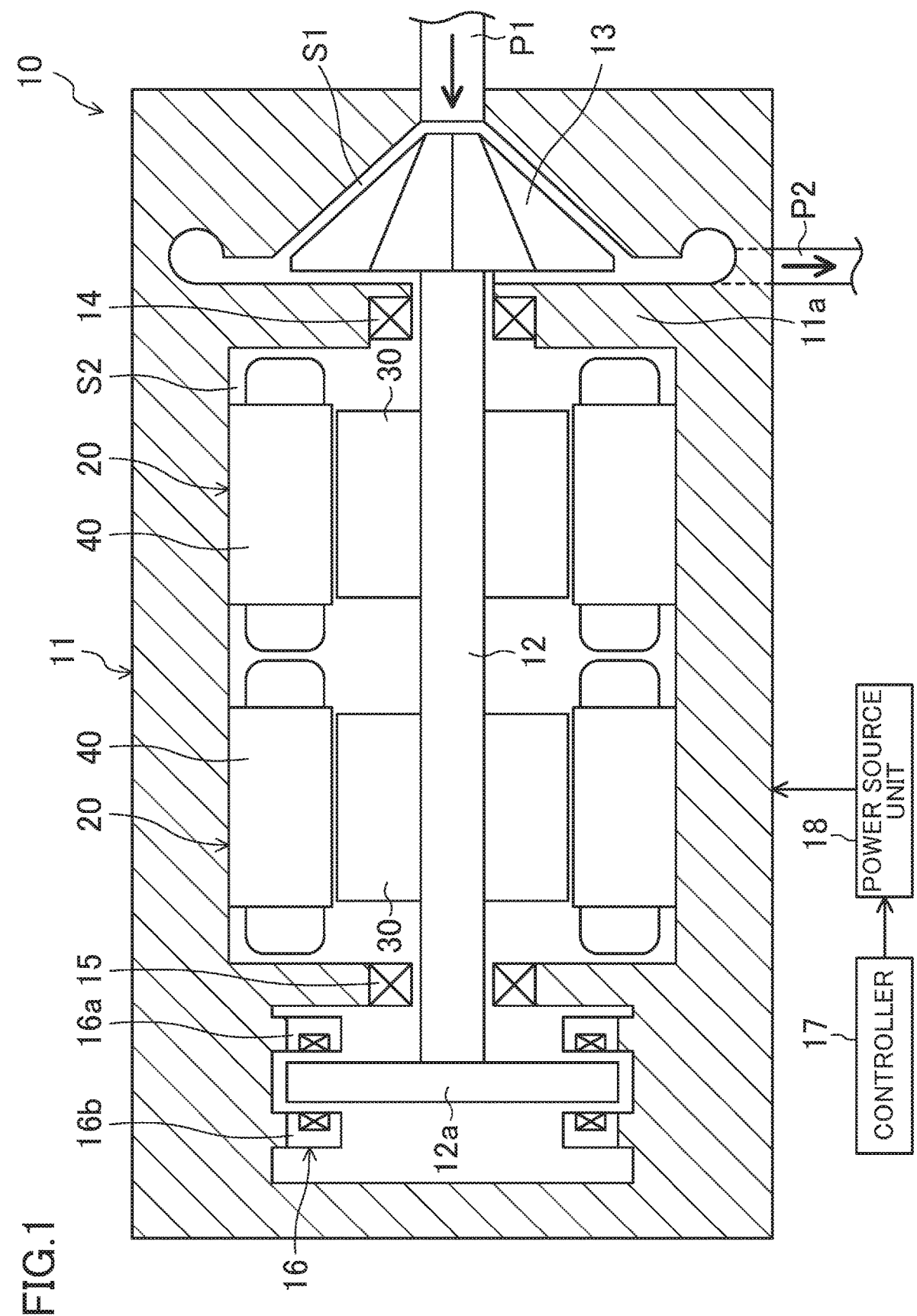
FIG. 1 is a longitudinal sectional view illustrating an example of the configuration of a turbo-compressor.

Hereafter, embodiments will be described in detail with reference to the drawings. In the drawings, elements that are the same as or correspond to each other will be denoted by the same numerals and description of such elements will not be repeated.

(Turbo-Compressor)

FIG. 1 illustrates an example of the configuration of a turbo-compressor (10) according to an embodiment. The turbo-compressor (10) is provided in a refrigerant circuit (not shown) and is configured to compress a refrigerant. In this example, the turbo-compressor (10) includes a casing (11), a drive shaft (12), an impeller (13), one or more (in this example, two) bearingless motors (20), a first touchdown bearing (14), a second touchdown bearing (15), a thrust magnetic bearing (16), a controller (17), and a power source unit (18).

In the following description, the term "axial direction" refers to the rotation axis direction and refers to the direction of the axis of the drive shaft (12), and the term "radial direction" refers to the direction perpendicular to the axial direction of the drive shaft (12). The term "outer peripheral side" refers to the side farther from the axis of the drive shaft (12), and the term "inner peripheral side" refers to the side closer to the axis of the drive shaft (12).

[Casing]

The casing (11) has a hollow cylindrical shape both ends of which are closed, and is disposed so that the cylindrical axis extends in the horizontal direction. The space in the casing (11) is divided by a wall (11a) into an impeller chamber (S1), which is a space on the right side of the wall (11a) and which contains the impeller (13), and an electric motor chamber (S2), which is a space on the left side of the wall (11a) and which contains the bearingless motors (20). The electric motor chamber (S2) contains the bearingless motors (20), the first touchdown bearing (14), the second touchdown bearing (15), and the thrust magnetic bearing (16), which are fixed to the inner peripheral wall of the electric motor chamber (S2).

[Drive Shaft]

The drive shaft (12) is provided in order to rotate the impeller (13). In this example, the drive shaft (12) extends in the casing (11) in the axial direction and couples the impeller (13) and the bearingless motors (20) to each other. To be specific, the impeller (13) is fixed to one end portion of the drive shaft (12), and the bearingless motors (20) are disposed on a middle portion of the drive shaft (12). A disk-shaped portion (hereafter, referred to as "disk portion (12a)") is provided at the other end portion of the drive shaft (12) (that is, an end portion opposite from the one end portion to which the impeller (13) is fixed). The drive shaft (12) is made of a magnetic material (such as iron).

[Impeller]

The impeller (13) is formed from a plurality of blades so as to have a substantially conical outer shape, and is coupled to the drive shaft (12). In this example, the impeller (13) is contained in the impeller chamber (S1) in a state of being fixed to the one end portion of the drive shaft (12). A suction pipe (P1) and a discharge pipe (P2) are connected to the impeller chamber (S1). The suction pipe (P1) is provided in order to introduce a refrigerant (fluid) into the impeller chamber (S1) from the outside. The discharge pipe (P2) is provided in order to return a high pressure refrigerant (fluid), which has been compressed in the impeller chamber (S1), to the outside. That is, in this example, the impeller (13) and the impeller chamber (S1) constitute a compression mechanism.

[Bearingless Motor (Electric Motor)]

Each bearingless motor (20) includes a rotor (30) and a stator (40), is configured to support the drive shaft (12) in a non-contact manner by using an electromagnetic force and to rotate the drive shaft (12) by using an electromagnetic force. The rotor (30) is fixed to the drive shaft (12), and the stator (40) is fixed to the inner peripheral wall of the casing (11). In this example, two bearingless motors (20) are arranged in the axial direction of the drive shaft (12). The configuration of each bearingless motor (20) will be described below in detail.

[Touchdown Bearing]

The first touchdown bearing (14) is provided in the vicinity of one end portion (right end portion in FIG. 1) of the drive shaft (12), and the second touchdown bearing (15) is provided in the vicinity of the other end portion (left end portion in FIG. 1) of the drive shaft (12). The first and second touchdown bearings (14, 15) are each configured to support the drive shaft (12) when the bearingless motors (20) are not energized (that is, when the drive shaft (12) is not floating).

[Thrust Magnetic Bearing]

The thrust magnetic bearing (16) includes first and second thrust electromagnets (16a, 16b), and is configured to support the disk portion (12a) of the drive shaft (12) in a non-contact manner by using an electromagnetic force. To be specific, the first and second thrust electromagnets (16a, 16b) each include a stator core and a winding portion (electric wire) each of which has an annular shape, face each other with the disk portion (12a) of the drive shaft (12) interposed therebetween, and support the disk portion (12a) of the drive shaft (12) in a non-contact manner with a combined electromagnetic force of the first and second thrust electromagnets (16a, 16b). That is, by controlling electric currents that flow in the first and second thrust electromagnets (16a, 16b), it is possible to control the combined electromagnetic force of the first and second thrust electromagnets (16a, 16b) and to control the position of the drive shaft (12) in the direction in which the first and second thrust electromagnets (16a, 16b) face each other (that is, the axial direction, and the left-right direction in FIG. 1).

[Various Sensors]

Various sensors (not shown), such as a position sensor, an electric current sensor, and a rotation speed sensor, are provided in various parts of the turbo-compressor (10). For example, each bearingless motor (20) is provided with a position sensor (not shown) that outputs a detection signal in accordance with the position of the rotor (30) in the radial direction; and the thrust magnetic bearing (16) is provided with a position sensor (not shown) that outputs a detection signal in accordance with the position of the drive shaft (12) in the thrust direction (axial direction). These position sensors are each constituted by, for example, an eddy-current displacement sensor that detects a gap (distance) between the position sensor and a measurement target.

[Controller]

The controller (17) is configured to generate and output a motor voltage command value and a thrust voltage command value on the basis of information, such as detection signals from various sensors provided in various parts of the turbo-compressor (10) and a target rotation speed of the drive shaft (12), so that the rotation speed of the drive shaft (12) becomes a predetermined target rotation speed in a state in which the drive shaft (12) is supported in a non-contact manner. The motor voltage command value is a command value for controlling a voltage to be supplied to the winding portion (electric wire) of the stator (40) of each bearingless motor (20). The thrust voltage command value is a command value for controlling a voltage supplied to the winding portion (electric wire) of each of the first and second thrust electromagnets (16a, 16b) of the thrust magnetic bearing (16). The controller (17) is constituted by, for example, a computational processing unit, such as a CPU, and a storage unit, such as a memory for storing programs and information for operating the computational processing unit.

[Power Source Unit]

The power source unit (18) is configured to supply voltages respectively to the winding portion (electric wire) of the stator (40) of each bearingless motor (20) and the winding portion (electric wire) of each of the first and second thrust electromagnets (16a, 16b) of the thrust magnetic bearing (16), on the basis of the motor voltage command value and the thrust voltage command value output from the controller (17). The power source unit (18) is constituted by, for example, a pulse width modulation (PWM) amplifier.

By controlling the voltage applied to the winding portion (electric wire) of the stator (40) of each bearingless motor (20), it is possible to control an electric current that flows in the winding portion (electric wire) of the stator (40) and to control magnetic flux generated in the bearingless motor (20). By controlling the voltage applied to the winding portion (electric wire) of each of the first and second thrust electromagnets (16a, 16b) of the thrust magnetic bearing (16), it is possible to control electric currents that flow in the winding portions (electric wires) of the first and second thrust electromagnets (16a. 16b) and to control the combined electromagnetic force of the first and second thrust electromagnets (16a, 16b).

[Configuration of Bearingless Motor]

Figure 2:
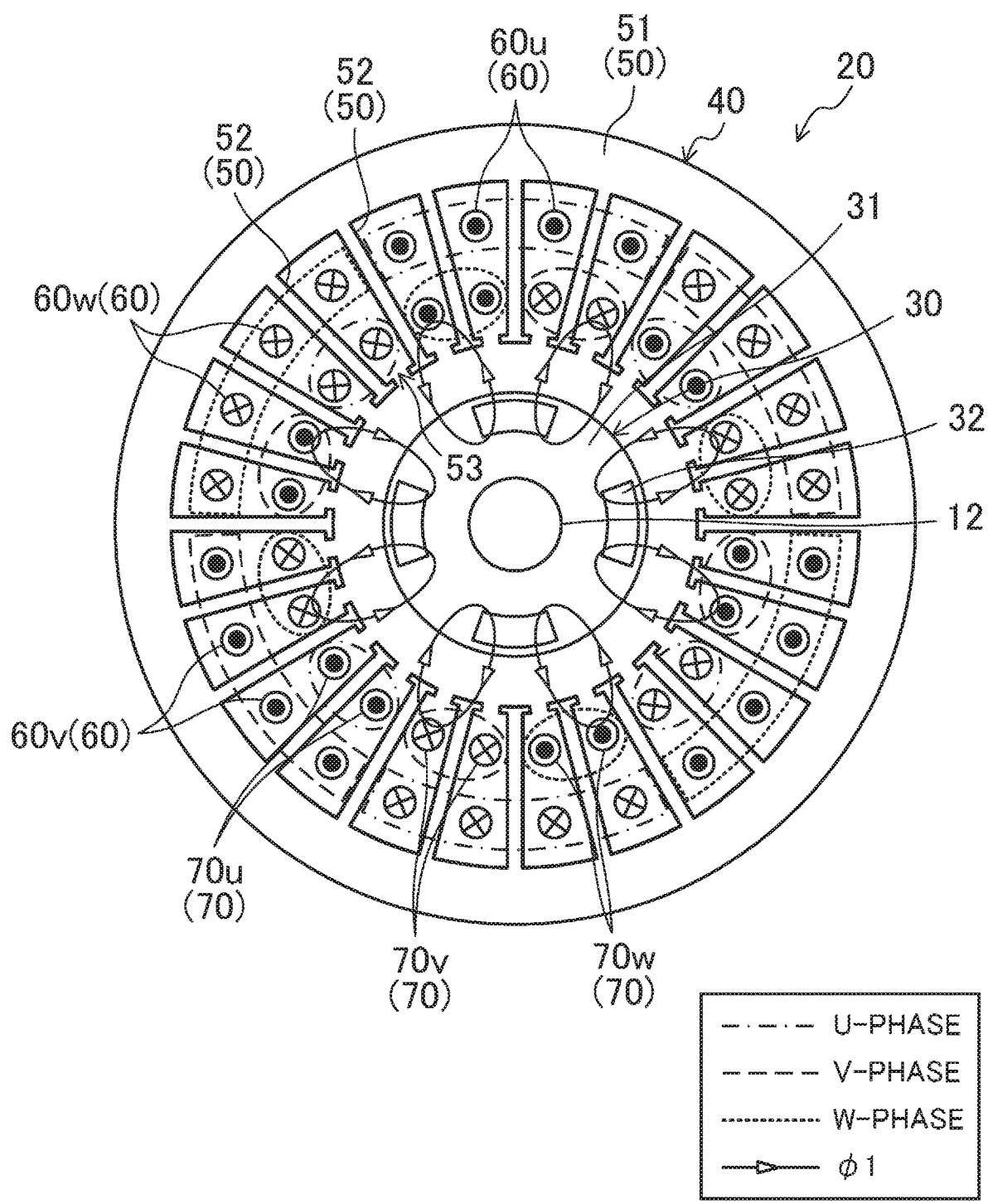
FIG. 2 is a cross-sectional view illustrating an example of the configuration of a bearingless motor.

FIG. 2 is a cross-sectional view illustrating an example of the configuration of the bearingless motor (20). In this example, the bearingless motor (20) constitutes a consequent pole bearingless motor (embedded-magnet bearingless motor). In FIG. 2, illustration of the winding portion (electric wire) is simplified, and illustration of hatching is omitted.

<Rotor>

The rotor (30) includes a rotor core (31) and a plurality of (in this example, four) permanent magnets (32) provided in the rotor core (31).

<<Rotor Core>>

The rotor core (31) is made of a magnetic material (such as a laminated steel plate) and has a solid cylindrical shape. A shaft hole, into which the drive shaft (12) is to be inserted, is formed in a central portion of the rotor core (31).

<<Permanent Magnet>>

The plurality of permanent magnets (32) are arranged at a predetermined angular pitch in the circumferential direction of the rotor (30). In this example, four permanent magnets (32) are arranged at an angular pitch of 90° in the circumferential direction of the rotor (30). In this example, the four permanent magnets (32) are embedded in the vicinity of the outer peripheral surface (outer peripheral portions) of the rotor core (31), and each have a shape (arc shape) along the outer peripheral surface of the rotor core (31). The outer peripheral sides of the four permanent magnets (32) are the N-poles, and parts of the outer peripheral surface of the rotor core (31) that are positioned between the four permanent magnets (32) in the circumferential direction of the rotor (30) are the pseudo-S-poles. Alternatively, the outer peripheral sides of the four permanent magnets (32) may be the S-poles. In this case, parts of the outer peripheral surface of the rotor core (31) that are positioned between the four permanent magnets (32) in the circumferential direction of the rotor (30) are the pseudo-N-poles.

<Stator>

The stator (40) includes a stator core (50), a support electric wire (60), and a drive electric wire (70).

<<Stator Core>>

The stator core (50) is made of a magnetic material (such as a laminated steel plate), and includes a back yoke (51) and a plurality of (in this example, twenty-four) teeth (52). The back yoke (51) has a ring shape (in this example, an annular shape). The plurality of teeth (52) are provided on the inner periphery of the back yoke (51). The plurality of teeth (52) are arranged at a predetermined pitch in the circumferential direction of the stator (40). With such a configuration, a slot (53), through which the support electric wire (60) and the drive electric wire (70) pass, are formed between each pair of teeth (52) that are adjacent to each other in the circumferential direction of the stator (40). That is, a plurality of (in this example, twenty-four) slots (53) are respectively formed between the plurality of (in this example, twenty-four) teeth (52) that are arranged in the circumferential direction of the stator (40).

<<Support Electric Wire>>

The support electric wire (60) is constituted by one or more conductive wires (61). The conductive wires (61) are made of a conductive material such as copper. The support electric wire (60) is disposed so as to pass through the plurality of slots (53), which are respectively formed between the plurality of teeth (52), and forms a support winding portion (winding portion that generates an electromagnetic force for supporting the rotor (30) in a non-contact manner by being energized).

In this example, three-phase support electric wires (a U-phase support electric wire (60u), a V-phase support electric wire (60v), and a W-phase support electric wire (60w)) are provided in the stator (40). In the example shown in FIG. 2, a support electric wire (60) surrounded by a thin chain line corresponds to the U-phase support electric wire (60u), a support electric wire (60) surrounded by a thin broken line corresponds to the V-phase support electric wire (60v), and a support electric wire (60) surrounded by a thin dotted line corresponds to the W-phase support electric wire (60w). The configuration of the support electric wire (60) will be described below in detail.

<<Drive Electric Wire>>

The drive electric wire (70) is constituted by one or more conductive wires (71). The conductive wires (71) are made of a conductive material such as copper. The drive electric wire (70) is disposed so as to pass through the plurality of slots (53), which are respectively formed between the plurality of teeth (52), and forms a drive winding portion (winding portion that generates an electromagnetic force for rotating the rotor (30) by being energized).

In this example, three-phase drive electric wires (a U-phase drive electric wire (70u), a V-phase drive electric wire (70v), and a W-phase drive electric wire (70w)) are provided in the stator (40). In the example shown in FIG. 2, a drive electric wire (70) surrounded by a thin chain line corresponds to the U-phase drive electric wire (70u), a drive electric wire (70) surrounded by a thin broken line corresponds to the V-phase drive electric wire (70v), and a drive electric wire (70) surrounded by a thin dotted line corresponds to the W-phase drive electric wire (70w). The configuration of the drive electric wire (70) will be described below in detail.

[Operation of Bearingless Motor]

Figure 3:
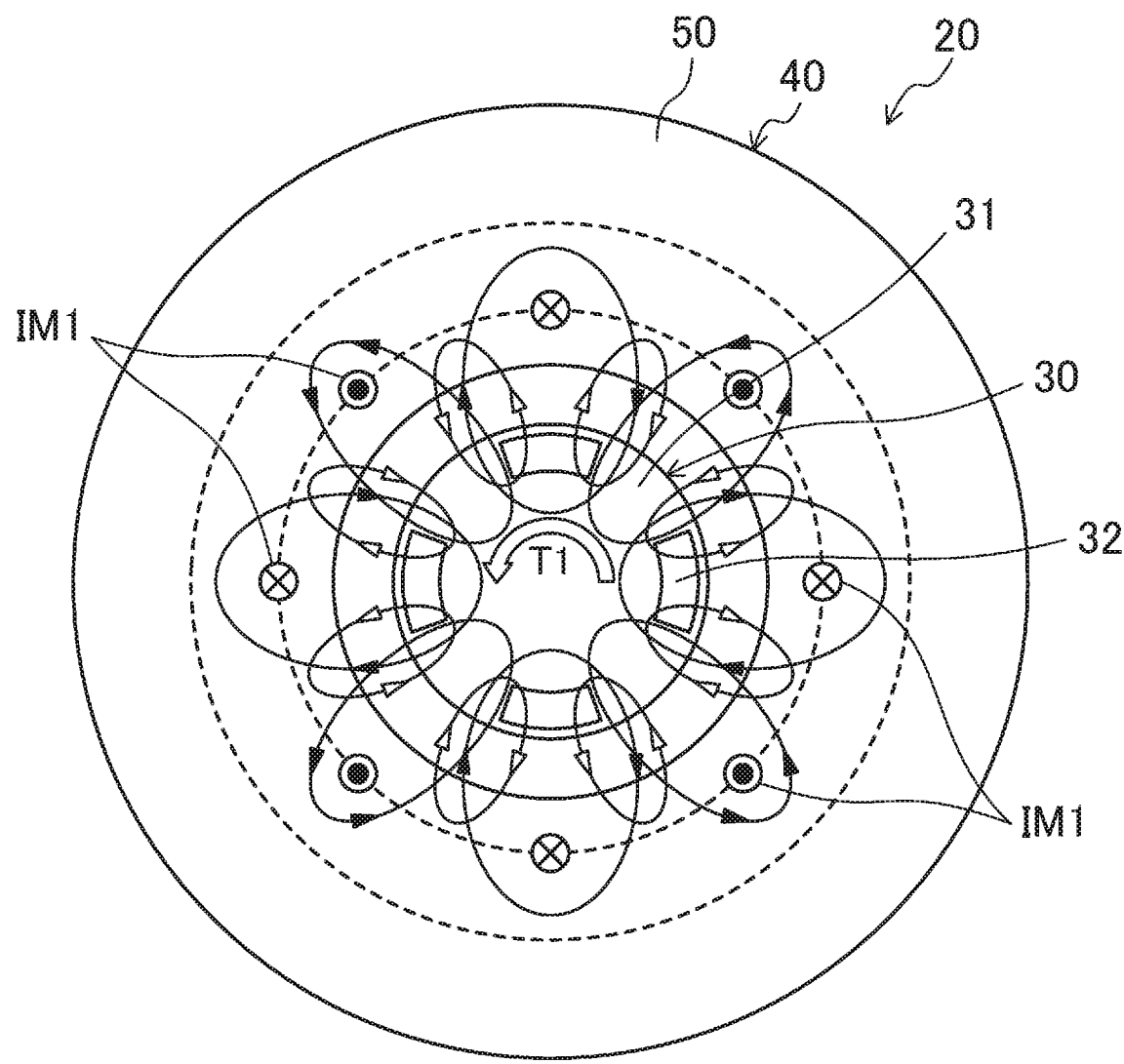
FIG. 3 is a cross-sectional view illustrating examples of magnet magnetic flux and drive magnetic flux generated in the bearingless motor.
Figure 4:
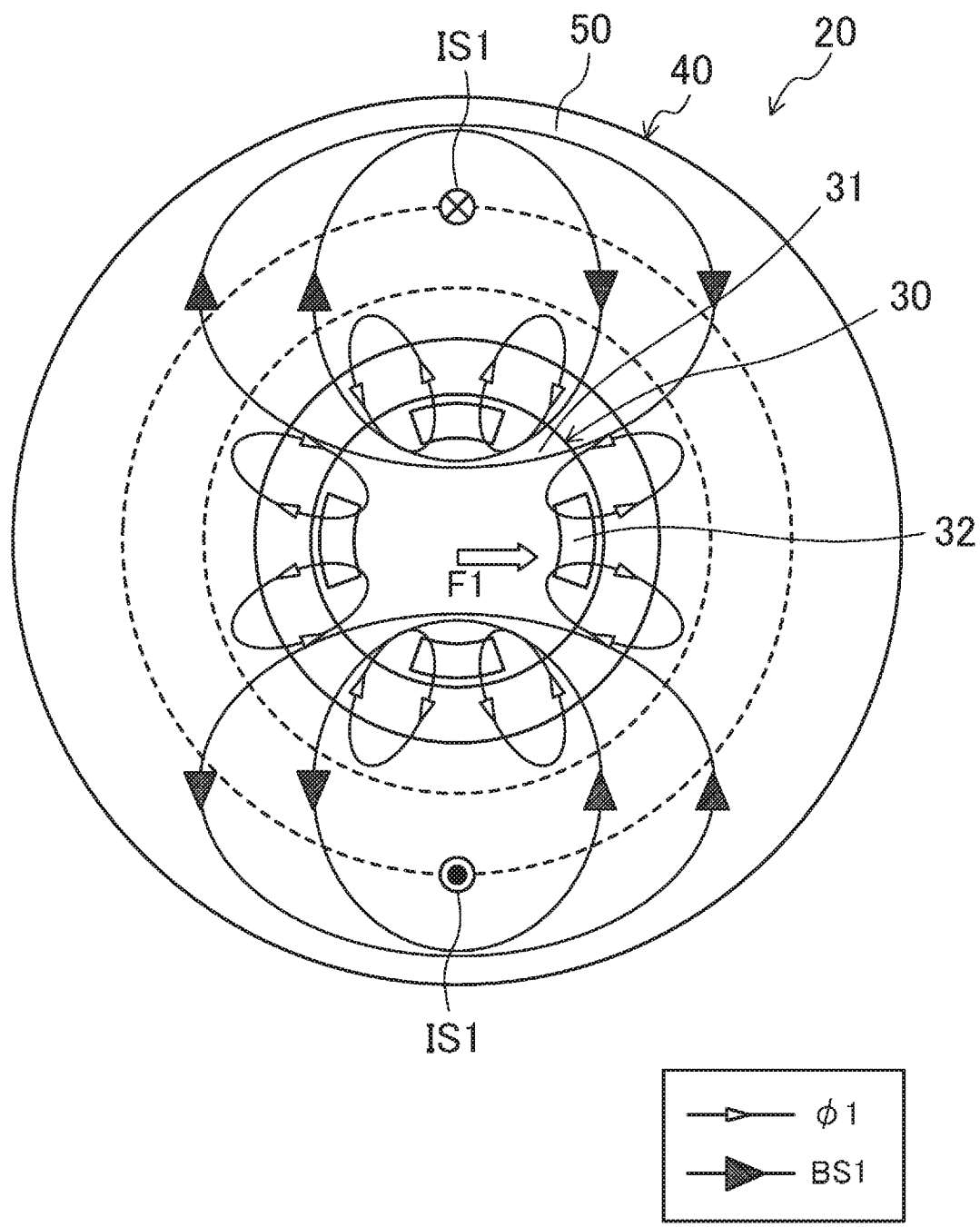
FIG. 4 is a cross-sectional view illustrating examples of magnet magnetic flux and support magnetic flux generated in the bearingless motor.

Next, referring to FIGS. 3 to 5, an operation of each bearingless motor (20) will be described. In FIGS. 3 to 5, illustration of the stator (40) is simplified, and illustration of the drive shaft (12) is omitted.

FIG. 3 illustrates examples of magnet magnetic flux (magnet magnetic flux (ϕ1) generated by the permanent magnets (32)) and drive magnetic flux (drive magnetic flux (BM1) generated in order to rotate the drive shaft (12)), which are generated in the bearingless motor (20). The drive magnetic flux (BM1) is magnetic flux that is generated in accordance with an electric current that flows in the winding portion of the drive electric wire (70). The bearingless motor (20) is configured to generate an electromagnetic force for rotating the drive shaft (12) (a drive torque (T1) for rotating the drive shaft (12) counterclockwise in FIG. 3) by using the interaction between the magnet magnetic flux (ϕ1) and the drive magnetic flux (BM1). In FIG. 3, an electric current (IM1) that is equivalent to an electric current that flows in the winding portion of the drive electric wire (70) is shown.

FIG. 4 illustrates examples of the magnet magnetic flux (ϕ1) and support magnetic flux (support magnetic flux (BS1) generated in order to support the drive shaft (12) in a non-contact manner), which are generated in the bearingless motor (20). The support magnetic flux (BS1) is magnetic flux that is generated in accordance with an electric current that flows in the winding portion of the support electric wire (60). The bearingless motor (20) is configured to generate an electromagnetic force for supporting the drive shaft (12) in a non-contact manner (a supporting force (F1) that acts on the drive shaft (12) rightward in FIG. 4) by using the interaction between the magnet magnetic flux (ϕ1) and the support magnetic flux (BS1). In FIG. 4, an electric current (IS1) that is equivalent to an electric current that flows in the winding portion of the support electric wire (60) is shown.

FIG. 5 illustrates examples of the magnet magnetic flux (ϕ1), the drive magnetic flux (BM1), and the support magnetic flux (BS1), which are generated in the bearingless motor (20). The bearingless motor (20) is configured to simultaneously generate the drive torque (T1) and the supporting force (F1) by using the interaction among the magnet magnetic flux (ϕ1), the drive magnetic flux (BM1), and the support magnetic flux (BS1). In FIG. 5, the electric current (IM1) which is equivalent to an electric current that flows in the winding portion of the drive electric wire (70), and the electric current (IS1), which is equivalent to an electric current that flows in the winding portion of the support electric wire (60), are shown.

[Configuration of Electric Wire]

Figure 6:
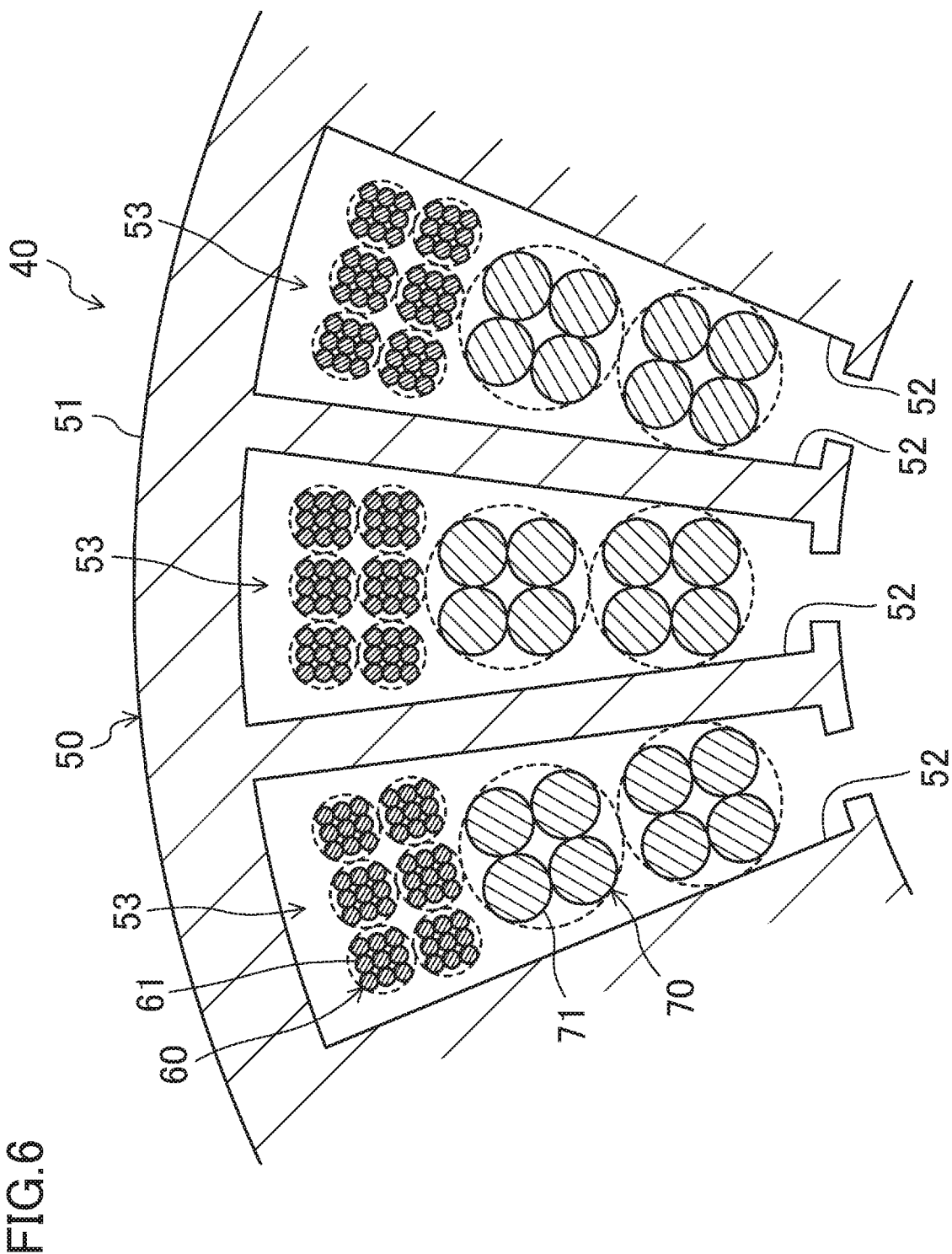
FIG. 6 is a partial sectional view illustrating an example of the configuration of a stator.

Next, referring to FIG. 6, the configurations of electric wires (the support electric wire (60) and the drive electric wire (70)) provided in the stator (40) will be described. In this example, the support electric wire (60) is constituted by a plurality of (in this example, nine) conductive wires (61), and the drive electric wire (70) is constituted by a plurality of (in this example, four) conductive wires (71). In FIG. 6, a bundle of nine conductive wires (61) that constitute one support electric wire (60) is surrounded by a dotted line, and a bundle of four conductive wires (71) that constitute one drive electric wire (70) is surrounded by a dotted line.

In this example, the support electric wire (60) and the drive electric wire (70) that pass through one slot (53) are electrically insulated from each other. For example, an insulating member (a member for electrically insulating the support electric wire (60) and the drive electric wire (70) from each other, not shown) is provided between the support electric wire (60) and the drive electric wire (70) that pass through one slot (53).

In this example, the support electric wire (60) and the drive electric wire (70) are each disposed between the plurality of teeth (52) by distributed winding. In one slot (53), the support electric wire (60) is disposed outside in the radial direction relative to the drive electric wire (70).

<Cross-Sectional Area per Conductive Wire of Electric Wire>

As illustrated in FIG. 6, the cross-sectional area per conductive wire (61) of the support electric wire (60) differs from the cross-sectional area per conductive wire (71) of the drive electric wire (70). In this example, the cross-sectional area per conductive wire (61) of the support electric wire (60) is smaller than the cross-sectional area per conductive wire (71) of the drive electric wire (70).

<Space Factor of Electric Wire in Slot>

In this example, the cross-sectional area per conductive wire of one of the support electric wire (60) and the drive electric wire (70) whose space factor in the slot (53) (that is, the ratio of the sum of the cross-sectional areas of the conductive wires thereof that pass through the slot (53) to the cross-sectional area of the slot (53)) is lower is smaller than the cross-sectional area per conductive wire of the other of the support electric wire (60) and the drive electric wire (70) whose space factor in the slot (53) is higher. In this example, the space factor of the support electric wire (60) in the slot (53) is lower than the space factor of the drive electric wire (70) in the slot (53). That is, the ratio of the sum of the cross-sectional areas of the conductive wires (61) of the support electric wire (60) that pass through the slot (53) to the cross-sectional area of the slot (53) is lower than the ratio of the sum of the cross-sectional areas of the conductive wires (71) of the drive electric wires (70) that pass through the slot (53) to the cross-sectional area of the slot (53).

The space factor of the support electric wire (60) in the slot (53) corresponds to the ratio of the sum of the cross-sectional areas of the conductive wires (61) of the support electric wire (60) that pass through the slot (53) to the cross-sectional area (opening area) of the slot (53). The sum of the cross-sectional areas of the conductive wires (61) of the support electric wire (60) that pass through one slot (53) corresponds to the product of the number of times the support electric wire (60) passes through one slot (53) and the sum of the cross-sectional areas of the conductive wires (61) of one support electric wire (60).

Likewise, the space factor of the drive electric wire (70) in the slot (53) corresponds to the ratio of the sum of the cross-sectional areas of the conductive wires (71) of the drive electric wire (70) that pass through the slot (53) to the cross-sectional area (opening area) of the slot (53). The sum of the cross-sectional areas of the conductive wires (71) of the drive electric wire (70) that pass through the slot (53) corresponds to the product of the number of times the drive electric wire (70) passes through one slot (53) and the sum of the cross-sectional areas of the conductive wires (71) of one drive electric wire (70).

<Number of Conductive Wires that Pass Through Slot>

In this example, the cross-sectional area per conductive wire of one of the support electric wire (60) and the drive electric wire (70) that includes a larger number of conductive wires that pass through the slot (53) is smaller than the cross-sectional area per conductive wire of the other of the support electric wire (60) and the drive electric wire (70) that includes a smaller number of conductive wires that pass through the slot (53). In this example, the number of the conductive wires (61) of the support electric wire (60) that pass through one slot (53) is larger than the number of the conductive wires (71) of the drive electric wire (70) that pass through one slot (53).

The number of the conductive wires (61) of the support electric wire (60) that pass through one slot (53) corresponds to the product of the number of the conductive wires (61) of one support electric wire (60) and the number of times the support electric wire (60) passes through one slot (53). In the example shown in FIG. 6, the number of the conductive wires (61) of the support electric wire (60) that pass through one slot (53) is 54 (=9×6).

Likewise, the number of the conductive wires (71) of the drive electric wire (70) that pass through one slot (53) corresponds to the product of the number of the conductive wires (71) of one drive electric wire (70) and the number of times the drive electric wire (70) passes through one slot (53). In the example shown in FIG. 6, the number of the conductive wires (71) of the drive electric wire (70) that pass through one slot (53) is 8 (=4×2).

<Sum of Cross-Sectional Areas of Conductive Wires of Electric Wire>

In this example, the cross-sectional area per conductive wire of one of the support electric wire (60) and the drive electric wire (70) for which the sum of the cross-sectional areas of the conductive wires thereof is smaller is smaller than the cross-sectional area per conductive wire of the other of the support electric wire (60) and the drive electric wire (70) for which the sum of the cross-sectional areas of the conductive wires thereof is larger. In this example, the sum of the cross-sectional areas of the conductive wires (61) of the support electric wire (60) is smaller than the sum of the cross-sectional areas of the conductive wires (71) of the drive electric wire (70). To be specific, in the example shown in FIG. 6, the sum of the cross-sectional areas of the nine conductive wires (61) of the support electric wire (60) is smaller than the sum of the cross-sectional areas of the four conductive wires (71) of the drive electric wire (70).

<Number of Electric Wires that Pass Through Slot>

In this example, the cross-sectional area per conductive wire of one of the support electric wire (60) and the drive electric wire (70) that includes a larger number of electric wires that pass through each of the slots (53) is smaller than the cross-sectional area per conductive wire of the other of the support electric wire (60) and the drive electric wire (70) that includes a smaller number of electric wires that pass through the slot (53). In this example, the number of the support electric wires (60) that pass through the slot (53) is larger than the number of the drive electric wires (70) that pass through the slot (53).

In the example shown in FIG. 6, the number of the support electric wires (60) that pass through one slot (53) is six. The number of the drive electric wires (70) that pass through one slot (53) is two.

<Summary of Electric Wire Structure>

To summarize the above, in this example, the space factor of the support electric wire (60) in the slot (53) (that is, the ratio of the sum of the cross-sectional areas of the conductive wires thereof that pass through the slot (53) to the cross-sectional area of the slot (53)) is lower than the space factor of the drive electric wire (70) in the slot (53). The number of the conductive wires (61) of the support electric wire (60) that pass through the slot (53) is larger than the number of the conductive wires (71) of the drive electric wires (70) that pass through the slot (53). The sum of the cross-sectional areas of the conductive wires (61) of the support electric wire (60) is smaller than the sum of the cross-sectional areas of the conductive wires (71) of the drive electric wire (70). The number of the support electric wires (60) that pass through the slot (53) is larger than the number of the drive electric wires (70) that pass through the slot (53). The cross-sectional area per conductive wire (61) of the support electric wire (60) is smaller than the cross-sectional area per conductive wire (71) of the drive electric wire (70).

COMPARATIVE EXAMPLE

Next, a bearingless motor (20) according to a comparative example will be described. Here, a bearingless motor in which the support electric wire (60) and the drive electric wire (70) are configured by using common conductive wires will be described as an example. That is, in the bearingless motor (20) according to the comparative example, the cross-sectional area per conductive wire (61) of the support electric wire (60) is the same as the cross-sectional area per conductive wire (71) of the drive electric wire (70).

It is conceivable that such a bearingless motor (the bearingless motor (20) according to the comparative example) can be manufactured by: configuring the support electric wire (60) and the drive electric wire (70) by using common conductive wires; and adjusting the number of conductive wires of the support electric wire (60) and the number of conductive wires of the drive electric wire (70) in accordance with space factors (the ratio of the sum of the cross-sectional areas of conductive wires that pass through the slot (53) to the cross-sectional area of the slot (53)) that are respectively required for the support electric wire (60) and the drive electric wire (70). However, when configuring the support electric wire (60) and the drive electric wire (70) by using common conductive wires, it is difficult to improve the degree of freedom in design of electric wires while obtaining space factors required for the electric wires.

For example, it is conceivable that the degree of freedom in design of electric wires in the bearingless motor described above can be improved by reducing the cross-sectional area of each common conductive wire of the drive electric wire (70) and the support electric wire (60). That is, it is conceivable that both of the cross-sectional area of each conductive wire of the drive electric wire (70) and the cross-sectional area of each conductive wire of the support electric wire (60) may be reduced. However, as the cross-sectional area of the conductive wire of an electric wire decreases, the space factor of the electric wire tends to decrease. Therefore, when configuring the drive electric wire (70) and the support electric wire (60) by using common conductive wires, it is difficult to maintain space factors required for the electric wires. On the other hand, in order to increase the space factors of the electric wires in the bearingless motor described above, it is conceivable that the cross-sectional area of each common conductive wire of the drive electric wire (70) and the support electric wire (60) may be increased. That is, it is conceivable that both of the cross-sectional area of each conductive wire of the drive electric wire (70) and the cross-sectional area of each conductive wire of the support electric wire (60) may be increased. However, as the cross-sectional area of the conductive wire of an electric wire increases, the allowable bend radius of the electric wire tends to increase. Therefore, when configuring the drive electric wire (70) and the support electric wire (60) by using common conductive wires, it is difficult to improve the degree of freedom in design of the electric wires.

Advantageous Effects of Embodiment

In the bearingless motor (20) according to the present embodiment, the cross-sectional area per conductive wire (61) of the support electric wire (60) differs from the cross-sectional area per conductive wire (71) of the drive electric wire (70). Thus, while improving the space factor of one of the support electric wire (60) and the drive electric wire (70) (for example, one of the electric wires for which a higher space factor is required), it is possible to reduce the allowable bend radius of the other of the support electric wire (60) and the drive electric wire (70) (for example, the other of the electric wires for which a lower space factor is required). Thus, it is possible to improve the degree of freedom in design of electric wires while obtaining space factors required for the electric wires.

Moreover, by causing the cross-sectional area per conductive wire of one of the support electric wire (60) and the drive electric wire (70) whose space factor in the slot (53) (that is, the ratio of the sum of the cross-sectional areas of the conductive wires thereof that pass through the slot (53) to the cross-sectional area of the slot (53)) is lower to be smaller than the cross-sectional area per conductive wire of the other of the support electric wire (60) and the drive electric wire (70) whose space factor in the slot (53) is higher, it is possible to increase the space factor of the other of the support electric wire (60) and the drive electric wire (70) whose space factor in the slot (53) is higher. Thus, it is possible to effectively improve the space factors of the electric wires in the slot (53) (the sum of the space factor of the support electric wire (60) and the space factor of the drive electric wire (70)).

By causing the cross-sectional area per conductive wire of one of the support electric wire (60) and the drive electric wire (70) that includes a larger number of conductive wires that pass through the slot (53) to be smaller than the cross-sectional area per conductive wire of the other of the support electric wire (60) and the drive electric wire (70) that includes a smaller number of conductive wires that pass through the slot (53), it is possible to reduce the allowable bend radius of the one of the support electric wire (60) and the drive electric wire (70) that includes a larger number of conductive wires that pass through the slot (53) (one of the electric wires whose coil end portion tends to become large). Thus, it is easy to reduce the size of the coil end portion of the bearingless motor (20) (a portion constituted by the coil end portion of the support electric wire (60) and the coil end portion of the drive electric wire (70)).

By causing the cross-sectional area per conductive wire of one of the support electric wire (60) and the drive electric wire (70) for which the sum of the cross-sectional areas of the conductive wires thereof is smaller to be smaller than the cross-sectional area per conductive wire of the other of the support electric wire (60) and the drive electric wire (70) for which the sum of the cross-sectional areas of the conductive wires thereof is larger, it is possible to increase the space factor of the other of the support electric wire (60) and the drive electric wire (70) for which the sum of the cross-sectional areas of the conductive wires thereof is larger. Thus, it is possible to effectively improve the space factors of the electric wires in the slot (53) (the sum of the space factor of the support electric wire (60) and the space factor of the drive electric wire (70)).

By causing the cross-sectional area per conductive wire of one of the support electric wire (60) and the drive electric wire (70) that includes a larger number of electric wires that pass through the slot (53) to be smaller than the cross-sectional area per conductive wire of the other of the support electric wire (60) and the drive electric wire (70) that includes a smaller number of electric wires that pass through the slot (53), it is possible to improve the degree of freedom in design of the one of the support electric wire (60) and the drive electric wire (70) that includes a larger number of electric wires that pass through the slot (53). Thus, it is possible to reduce the allowable bend radius of the one of the support electric wire (60) and the drive electric wire (70) that includes a larger number of conductive wires that pass through the slot (53) (one of the electric wires whose coil end portion tends to become large). Thus, it is easy to reduce the size of the coil end portion of the bearingless motor (20) (a portion constituted by the coil end portion of the support electric wire (60) and the coil end portion of the drive electric wire (70)).

In this example, the cross-sectional area per conductive wire (61) of the support electric wire (60) is smaller than the cross-sectional area per conductive wire (71) of the drive electric wire (70). With such a configuration, it is possible to reduce the allowable bend radius of the support electric wire (60) while effectively improving the space factor of the drive electric wire (70). By improving the space factor of the drive electric wire (70), it is possible to increase an electromagnetic force (an electromagnetic force for rotating the rotor (30)) that is generated when the drive electric wire (70) is energized, and, as a result, it is possible to increase the torque of the rotor (30). Accordingly, by effectively improving the space factor of the drive electric wire (70), it is easy to obtain an electromagnetic force required to rotate the rotor (30).

In this example, the space factor of the support electric wire (60) in the slot (53) (that is, the ratio of the sum of the cross-sectional areas of the conductive wires thereof that pass through the slot (53) to the cross-sectional area of the slot (53)) is lower than the space factor of the drive electric wire (70) in the slot (53). With such a configuration, it is possible to cause an electromagnetic force (an electromagnetic force for rotating the rotor (30)) that is generated when the drive electric wire (70) is energized to be larger than an electromagnetic force (an electromagnetic force for supporting the rotor (30) in a non-contact manner) that is generated when the support electric wire (60) is energized. Thus, it is easy to obtain an electromagnetic force required to rotate the rotor (30).

In this example, the sum of the cross-sectional areas of the conductive wires (61) of the support electric wire (60) is smaller than the sum of the cross-sectional areas of the conductive wires (71) of the drive electric wire (70). With such a configuration, it is possible to cause the amount of electric current that can flow through the drive electric wire (70) to be larger than the amount of electric current that can flow through the support electric wire (60). Thus, it is easy to obtain an amount of electric current required by the drive electric wire (70) to rotate the rotor (30) (the amount of electric current that is necessary to generate an electromagnetic force required to rotate the rotor (30)).

In this example, the number of the support electric wires (60) that pass through the slot (53) is larger than the number of the drive electric wires (70) that pass through the slot (53). With such a configuration, it is possible to reduce induced electric power that is generated due to rotation of the rotor (30). Thus, it is possible to suppress increase of induced electric power that occurs when the rotation speed of the rotor (30) increases.

Moreover, it is possible to improve the degree of freedom in design of electric wires while obtaining space factors required for the electric wires in the bearingless motor (20), and therefore it is possible to reduce the size of the coil end portion of the bearingless motor (20). Thus, it is possible to reduce the wiring length of an electric wire in the bearingless motor (20), and therefore it is possible to reduce the copper loss of the electric wire. Furthermore, it is possible to reduce the length of the coil end portion of the bearingless motor (20) in the axial direction, and therefore it is possible to reduce the axial length of the drive shaft (12). Thus, it is possible to reduce the size of the turbo-compressor (10) (to be specific, to reduce the length of the turbo-compressor (10) in the axial direction). Furthermore, it is possible to increase the critical speed of the drive shaft (12), and therefore it is possible to increase the rotation speed of the drive shaft (12).

(Stators according to First to Third Modifications)

Figure 7:
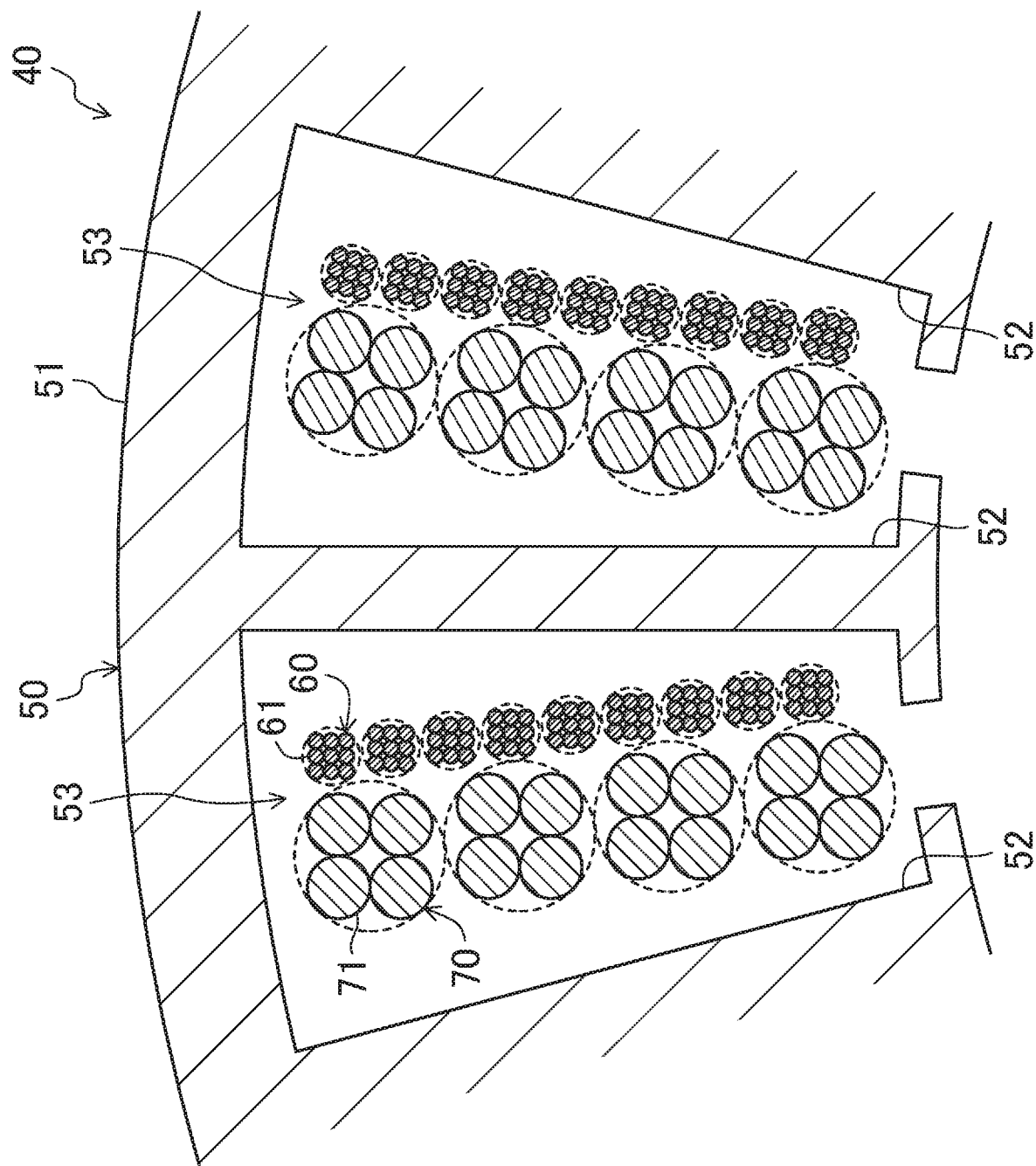
FIG. 7 is a partial sectional view illustrating an example of a stator according to a first modification.
Figure 8:
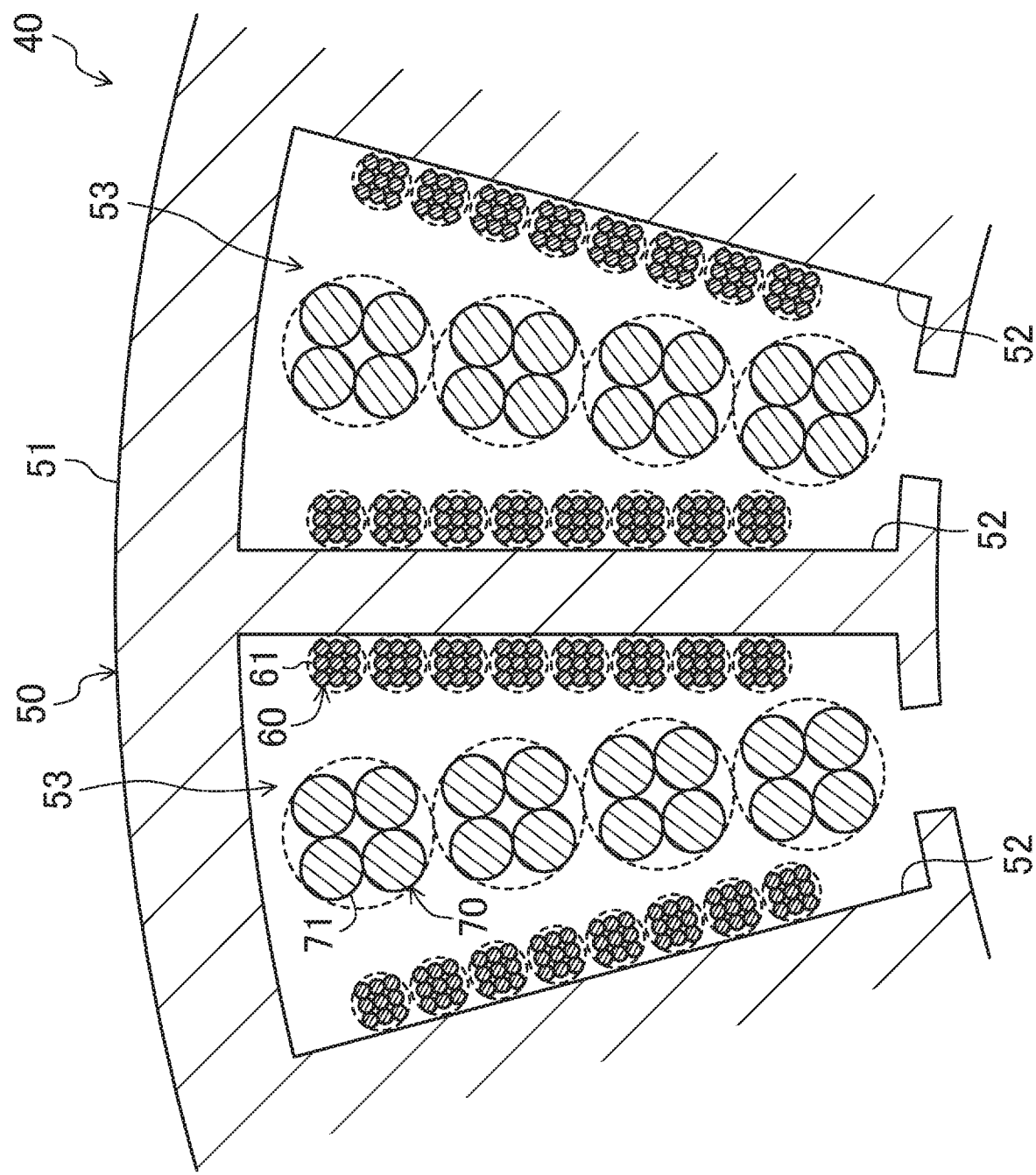
FIG. 8 is a partial sectional view illustrating an example of a stator according to a second modification.
Figure 9:
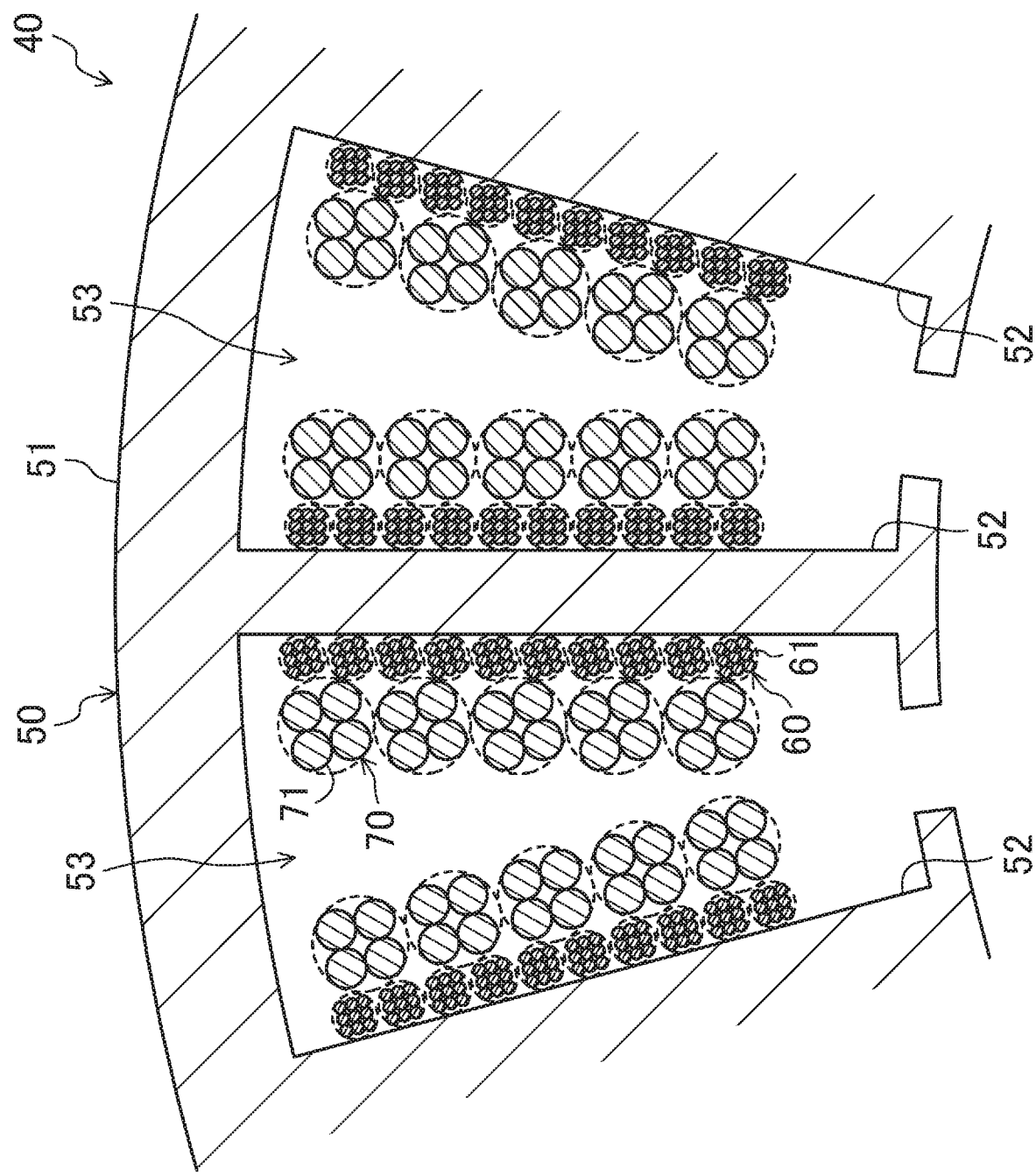
FIG. 9 is a partial sectional view illustrating an example of a stator according to a third modification.

Next, referring to FIGS. 7 to 9, stators (40) according to first to third modifications will be described. FIGS. 7, 8, and 9 respectively illustrate examples of stators (40) according to first, second, and third modifications.

As illustrated in FIGS. 7, 8, and 9, the support electric wire (60) and the drive electric wire (70) may be disposed adjacent to each other in the circumferential direction of the stator (40). That is, the support electric wire (60) and the drive electric wire (70) may be disposed between the plurality of teeth (52) in such a way that the support electric wire (60) and the drive electric wire (70) are adjacent to each other in one slot (53) in the circumferential direction of the stator (40).

The support electric wire (60) and the drive electric wire (70) may be disposed in such a way that a part or the entirety of one of the support electric wire (60) and the drive electric wire (70) whose cross-sectional area per conductive wire is smaller is covered by a part or the entirety of the other of the support electric wire (60) and the drive electric wire (70) whose cross-sectional area per conductive wire is larger. That is, among the support electric wire (60) and the drive electric wire (70) that pass through one slot (53) so as to extend along one of two teeth (52) that form both side surfaces of the slot (53) in the circumferential direction, one of the support electric wire (60) and the drive electric wire (70) whose cross-sectional area per conductive wire is smaller may be positioned closer to the one of two teeth (52) than the other of the support electric wire (60) and the drive electric wire (70) whose cross-sectional area per conductive wire is larger. In this case, the other of the support electric wire (60) and the drive electric wire (70) whose cross-sectional area per conductive wire is larger is not covered by the one of the support electric wire (60) and the drive electric wire (70) whose cross-sectional area per conductive wire is smaller.

FIG. 7 illustrates a stator (40) according to the first modification, in which the support electric wire (60) and the drive electric wire (70) are each disposed between the plurality of teeth (52) by distributed winding. The cross-sectional area per conductive wire (61) of the support electric wire (60) is smaller than the cross-sectional area per conductive wire (71) of the drive electric wire (70). The support electric wire (60) and the drive electric wire (70) are disposed in such a way that a part or the entirety of the support electric wire (60) is covered by the drive electric wire (70). That is, the support electric wire (60) disposed along one of the teeth (52) is positioned closer to the one of the teeth (52) than the drive electric wire (70) disposed along the one of the teeth (52). In the example shown in FIG. 7, the drive electric wire (70) is not covered by the support electric wire (60).

FIG. 8 illustrates a stator (40) according to the second modification, in which the support electric wire (60) is wound around the plurality of teeth (52) by concentrated winding and the drive electric wire (70) is disposed between the plurality of teeth (52) by distributed winding. The cross-sectional area per conductive wire (61) of the support electric wire (60) is smaller than the cross-sectional area per conductive wire (71) of the drive electric wire (70). The support electric wire (60) and the drive electric wire (70) are disposed in such a way that a part or the entirety of the support electric wire (60) is covered by the drive electric wire (70). That is, the support electric wire (60) wound around one of the teeth (52) is positioned closer to the one of the teeth (52) than the drive electric wire (70) disposed along the one of the teeth (52). In the example shown in FIG. 8, the drive electric wire (70) is not covered by the support electric wire (60).

FIG. 9 illustrates a stator (40) according to the third modification, in which the support electric wire (60) and the drive electric wire (70) are each wound around the plurality of teeth (52) by concentrated winding. The cross-sectional area per conductive wire (61) of the support electric wire (60) is smaller than the cross-sectional area per conductive wire (71) of the drive electric wire (70). The support electric wire (60) and the drive electric wire (70) are disposed in such a way that a part or the entirety of the support electric wire (60) is covered by the drive electric wire (70). That is, the support electric wire (60) wound around one of the teeth (52) is positioned closer to the one of the teeth (52) than the drive electric wire (70) wound around the one of the teeth (52). In the example shown in FIG. 9, the drive electric wire (70) is not covered by the support electric wire (60).

In the examples shown in FIGS. 7, 8, and 9, the space factor of the support electric wire (60) in the slot (53) (that is, the ratio of the sum of the cross-sectional areas of the conductive wires thereof that pass through the slot (53) to the cross-sectional area of the slot (53)) is lower than the space factor of the drive electric wire (70) in the slot (53).

In the examples shown in FIGS. 7, 8, and 9, the number of the conductive wires (61) of the support electric wire (60) that pass through the slot (53) is larger than the number of the conductive wires (71) of the drive electric wires (70) that pass through the slot (53). To be specific, the number of the conductive wires (61) of the support electric wire (60) that pass through the slot (53) is 81 (=9×9) in the example shown in FIG. 7, is 144 (=9×8×2) in the example shown in FIG. 8, and is 180 (=9×10×2) in the example shown in FIG. 9. The number of the conductive wires (71) of the drive electric wires (70) that pass through the slot (53) is 16 (=4×4) in the examples shown in FIGS. 7 and 8, and is 40 (=4×5×2) in the example shown in FIG. 9.

In the example shown in FIGS. 7, 8, and 9, the sum of the cross-sectional areas of the conductive wires (61) of the support electric wire (60) is smaller than the sum of the cross-sectional areas of the conductive wires (71) of the drive electric wire (70).

In the example shown in FIGS. 7, 8, and 9, the number of the support electric wires (60) that pass through the slot (53) is larger than the number of the drive electric wires (70) that pass through the slot (53). To be specific, the number of the support electric wires (60) that pass through the slot (53) is 9 in the example shown in FIG. 7, is 16 (=8×2) in the example shown in FIG. 8, and is 20 (=10×2) in the example shown in FIG. 9. The number of the drive electric wires (70) that pass through the slot (53) is 4 in the examples shown in FIGS. 7 and 8, and is 10 (=5×2) in the example shown in FIG. 9.

[Advantageous Effects of Stators according to First to Third Modifications]

As described above, by disposing the support electric wire (60) and the drive electric wire (70) in such a way that a part or the entirety of one of the support electric wire (60) and the drive electric wire (70) whose cross-sectional area per conductive wire is smaller is covered by a part or the entirety of the other of the support electric wire (60) and the drive electric wire (70) whose cross-sectional area per conductive wire is larger, it is possible to dispose the one of the support electric wire (60) and the drive electric wire (70) whose cross-sectional area per conductive wire is smaller (the electric wire whose allowable bend radius is smaller) in a dead space between the other of the support electric wire (60) and the drive electric wire (70) whose cross-sectional area per conductive wire is larger (the electric wire whose allowable bend radius is larger) and one of the teeth (52). Thus, it is easy to reduce the size of the coil end portion of the bearingless motor (20) (a portion constituted by the coil end portion of the support electric wire (60) and coil end portion of the drive electric wire (70)).

(Stators according to Fourth to Sixth Modifications)

Figure 10:
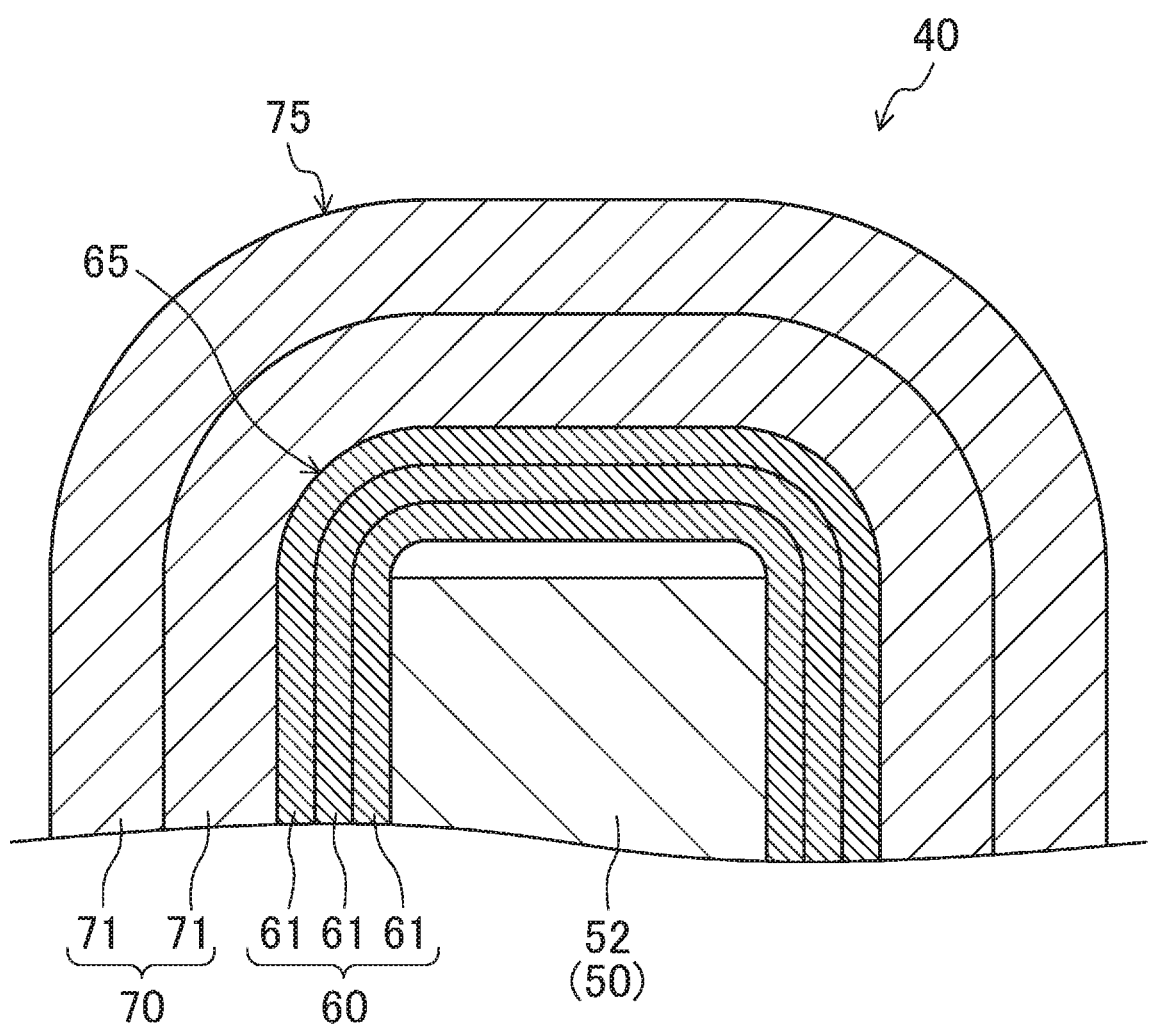
FIG. 10 is a partial sectional view illustrating an example of a stator according to a fourth modification.
Figure 11:
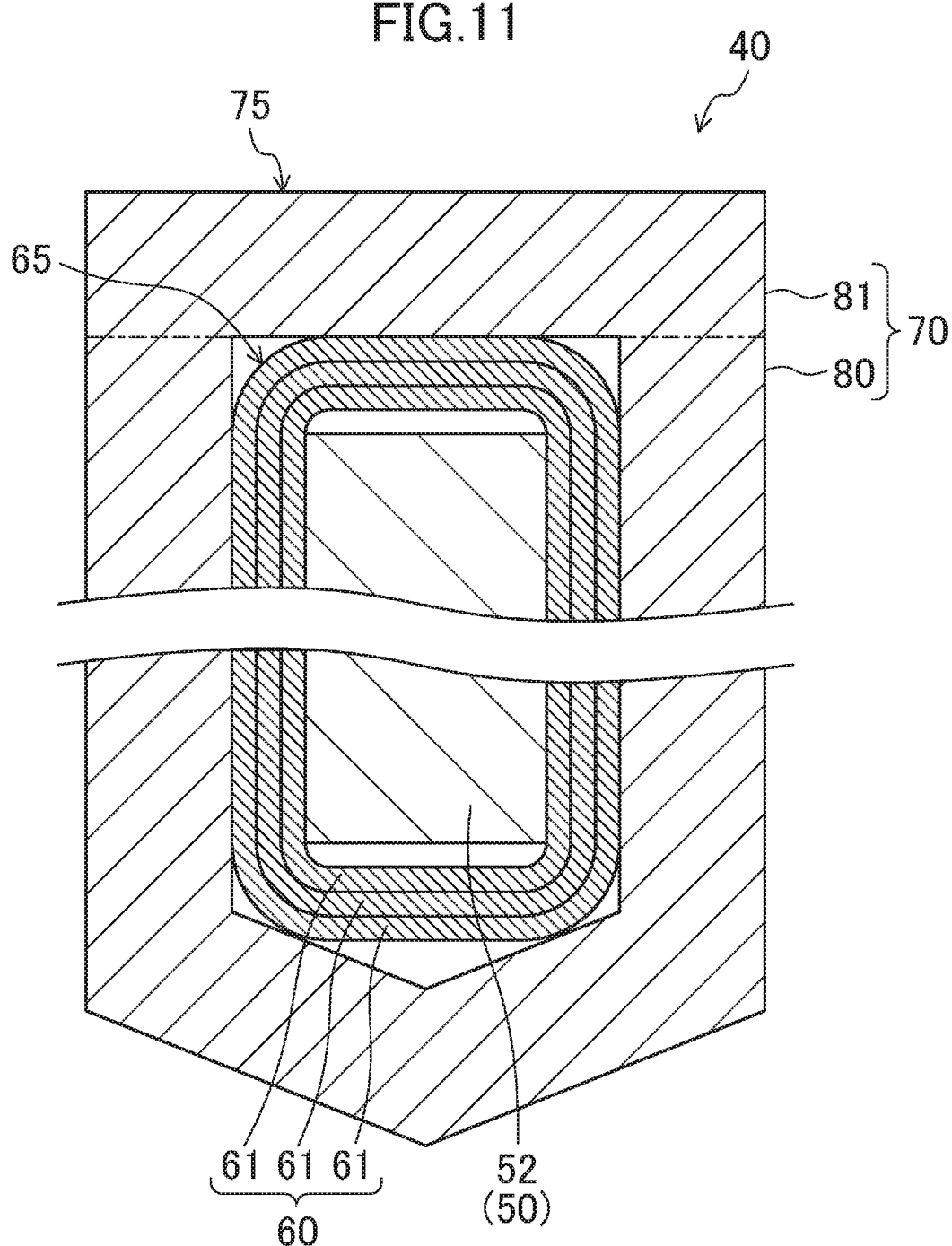
FIG. 11 is a partial plan view illustrating an example of a stator according to a fifth modification.
Figure 12:
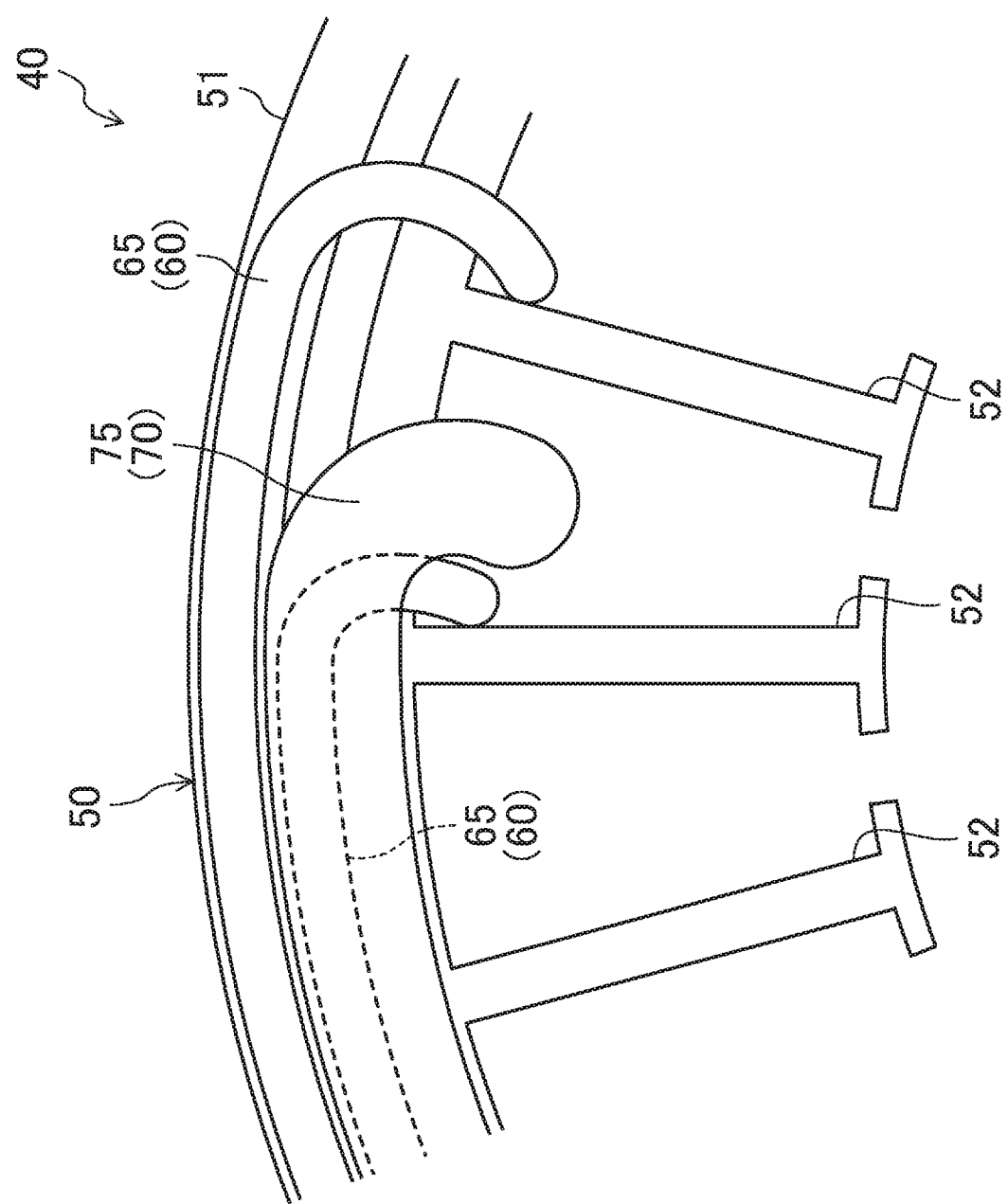
FIG. 12 is a partial plan view illustrating an example of a stator according to a sixth modification.
Figure 13:
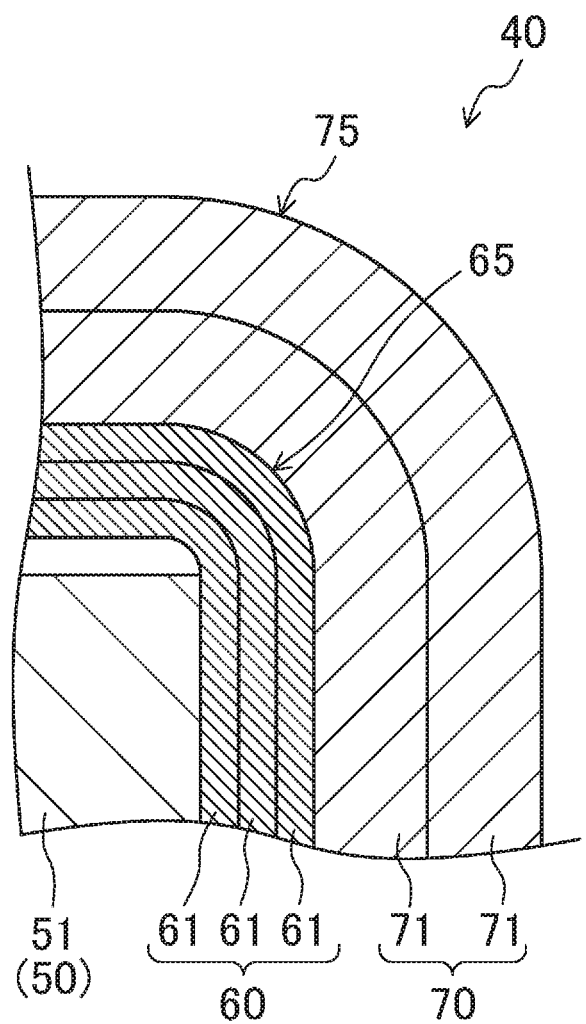
FIG. 13 is a partial sectional view illustrating an example of the stator according to the sixth modification.

Next, referring to FIGS. 10 to 13, stators (40) according to fourth to sixth modifications will be described. FIGS. 10 and 11 respectively illustrate stators (40) according to the fourth and fifth modifications. FIGS. 12 and 13 illustrate a stator (40) according to the sixth modification. FIGS. 10 and 11 each correspond to a cross section that is perpendicular to the radial direction of the drive shaft (12) and that passes through a central portion of a tooth (52) in the radial direction. FIG. 13 corresponds to a cross section that extends in the axial direction of the drive shaft (12) and that passes through the back yoke (51).

In the examples shown in FIGS. 10 and 11, a coil end portion (65) of the support electric wire (60) and a coil end portion (75) of the drive electric wire (70) are positioned outside in the axial direction of the tooth (52). That is, the coil end portion (65) of the support electric wire (60) and the coil end portion (75) of the drive electric wire (70) are not bent toward the back yoke (51)(that is, outside in the radial direction). In the example shown in FIGS. 12 and 13, the coil end portion (65) of the support electric wire (60) and the coil end portion (75) of the drive electric wire (70) are bent toward the back yoke (51) (that is, outside in the radial direction) and are positioned outside in the axial direction of the back yoke (51).

As illustrated in FIGS. 10, 11, and 13, a part or the entirety of the coil end portion of one of the support electric wire (60) and the drive electric wire (70) whose cross-sectional area per conductive wire is smaller may be covered by a part or the entirety of the coil end portion of the other of the support electric wire (60) and the drive electric wire (70) whose cross-sectional area per conductive wire is larger. That is, the coil end portion of one of the support electric wire (60) and the drive electric wire (70) whose cross-sectional area per conductive wire is smaller may be positioned closer to the stator core (50) (to be specific, closer to the tooth (52) in the examples shown in FIGS. 10 and 11, and closer to the back yoke (51) in the example shown in FIG. 13) than the coil end portion of the other of the support electric wire (60) and the drive electric wire (70) whose cross-sectional area per conductive wire is larger. In this case, the coil end portion of the other of the support electric wire (60) and the drive electric wire (70) whose cross-sectional area per conductive wire is larger is not covered by the coil end portion of the one of the support electric wire (60) and the drive electric wire (70) whose cross-sectional area per conductive wire is smaller.

As illustrated in FIG. 11, the other of the support electric wire (60) and the drive electric wire (70) whose cross-sectional area per conductive wire is larger may be constituted by a segment coil (80).

FIG. 10 illustrates a stator (40) according to the fourth modification, in which the cross-sectional area per conductive wire (61) of the support electric wire (60) is smaller than the cross-sectional area per conductive wire (71) of the drive electric wire (70). A part or the entirety of the coil end portion (65) of the support electric wire (60) is covered by a part or the entirety of the coil end portion (75) of the drive electric wire (70). That is, the coil end portion (65) of the support electric wire (60) is positioned closer to the tooth (52) than the coil end portion (75) of the drive electric wire (70). In the example shown in FIG. 10, the coil end portion (75) of the drive electric wire (70) is not covered by the coil end portion (65) of the support electric wire (60).

FIG. 11 illustrates a stator (40) according to the fifth modification, in which the drive electric wire (70) is constituted by the segment coil (80). The segment coil (80) is made of a conductive material such as copper and has a U-shape. In this example, the drive electric wire (70) is formed by welding (or contact-bonding) an end portion of the segment coil (80) to a coupling member (81) in a state in which the segment coil (80) is fitted onto the tooth (52). The coupling member (81) is made of a conductive material such as copper. That is, in this example, the drive electric wire (70) is constituted by one conductive wire (71), and the conductive wire (71) is constituted by the segment coil (80) and the coupling member (81).

In the stator (40) according to the fifth modification illustrated in FIG. 11, the cross-sectional area per conductive wire (61) of the support electric wire (60) is smaller than the cross-sectional area of the segment coil (80) of the drive electric wire (70) (that is, the cross-sectional area per conductive wire (71) of the drive electric wire (70)). A part or the entirety of the coil end portion (65) of the support electric wire (60) is covered by a part or the entirety of the coil end portion (75) of the drive electric wire (70). That is, the coil end portion (65) of the support electric wire (60) is positioned closer to the tooth (52) than the coil end portion (75) of the drive electric wire (70). In the example shown in FIG. 11, the coil end portion (75) of the drive electric wire (70) is not covered by the coil end portion (65) of the support electric wire (60).

FIGS. 12 and 13 illustrate a stator (40) according to the sixth modification, in which the cross-sectional area per conductive wire (61) of the support electric wire (60) is smaller than the cross-sectional area per conductive wire (71) of the drive electric wire (70). Apart or the entirety of the coil end portion (65) of the support electric wire (60) is covered by a part or the entirety of the coil end portion (75) of the drive electric wire (70). That is, the coil end portion (65) of the support electric wire (60) is positioned closer to the back yoke (51) than the coil end portion (75) of the drive electric wire (70). In the example shown in FIGS. 12 and 13, the coil end portion (75) of the drive electric wire (70) is not covered by the coil end portion (65) of the support electric wire (60).

[Advantageous Effects of Stators According to Fourth to Sixth Modifications]

As described above, because a part or the entirety of the coil end portion of one of the support electric wire (60) and the drive electric wire (70) whose cross-sectional area per conductive wire is smaller is covered by a part or the entirety of the coil end portion of the other of the support electric wire (60) and the drive electric wire (70) whose cross-sectional area per conductive wire is larger, it is possible to dispose the coil end portion of the one of the support electric wire (60) and the drive electric wire (70) whose cross-sectional area per conductive wire is smaller (the electric wire whose allowable bend radius is smaller) in a dead space between the coil end portion of the other of the support electric wire (60) and the drive electric wire (70) whose cross-sectional area per conductive wire is larger (the electric wire whose allowable bend radius is larger) and the stator core (50). Thus, it is easy to reduce the size of the coil end portion of the bearingless motor (20) (a portion constituted by the coil end portion of the support electric wire (60) and coil end portion of the drive electric wire (70)).

By forming the other of the support electric wire (60) and the drive electric wire (70) whose cross-sectional area per conductive wire is larger from the segment coil (80), it is easy to attach the other of the support electric wire (60) and the drive electric wire (70) whose cross-sectional area per conductive wire is larger.

OTHER EMBODIMENTS

In the examples described above, the bearingless motor (20) is a consequent pole bearingless motor (embedded magnet bearingless motor). However, the bearingless motor (20) is not limited to this. The bearingless motor (20) may be, for example, a surface magnet bearingless motor (not shown).

In the examples described above, two bearingless motors (20) are arranged in the axial direction of the drive shaft (12). However, the disposition of the bearingless motor (20) is not limited to this. For example, one bearingless motor (20) and one or more radial magnetic bearings (not shown) may be arranged in the axial direction of the drive shaft (12).

In the examples described above, the turbo-compressor (10) is disposed in a refrigerant circuit. However, the turbo-compressor (10) may be disposed in an apparatus or a system that is not a refrigerant circuit.

In the examples described above, the bearingless motor (20) is disposed in the turbo-compressor (10). However, the bearingless motor (20) may be disposed in an apparatus or a system that is not the turbo-compressor (10).

OTHER EXAMPLES

The following configuration examples (configuration examples 1 to 21) may be used for the turbo-compressor (10) and the bearingless motor (20).

Regarding Configuration Examples 1 to 5

When two types of windings (that is, electric wires, the same applies hereafter) having different cross-sectional shapes are contained in one slot, the windings may collapse or a dead space may be formed in the slot due to a mismatch between the shape of the slot and the shapes of the windings, and, as a result, it may become difficult to improve the space factors of the windings in the slot.

Configuration Example 1

Therefore, the shape of the slot may be a combination of two types of shapes that respectively correspond to the two types of windings (respectively optimal for the two types of windings) having different cross-sectional shapes. For example, when one of two types of windings contained in one slot has a quadrangular cross-sectional shape and the other winding has a circular cross-sectional shape, the slot shape may be a combination of a quadrangular shape (quadrangular shape in plan view) corresponding to the cross-sectional shape of the one of the windings and a circular shape (circular shape in plan view) corresponding to the cross-sectional shape of the other winding. With such a configuration, it is possible to improve the space factors of the windings in the slot and can reduce cost.

Configuration Example 2

The plurality of teeth may be formed in such a way that the width of each tooth (excluding a flange portion at the distal end of the tooth) is constant from the proximal end to the distal end of the tooth. With such a configuration, the effective iron amount in a gap cross-sectional area is the maximum, and the slot has a sectoral shape. One of two types of windings contained in one slot may be constituted by a segment coil (that is, one of the windings may have a quadrangular cross-sectional shape) and the other winding may have a circular cross-sectional shape. The one of the windings having a quadrangular cross-sectional shape may be contained in a central quadrangular portion of one slot having the sectoral shape (space that is positioned at a central portion in the circumferential direction and that has a quadrangular shape in plan view), and the other winding having a circular cross-sectional shape may be contained in triangular portions at both end portions of the one slot (spaces that are positioned at both end portions in the circumferential direction and each of which has a triangular shape in plan view). With such a configuration, it is possible to improve the space factors of the windings in the slot. Moreover, it is possible to reduce the size of the coil end portion of the windings. Furthermore, it is possible to simplify an operation of winding wires, and therefore it is possible to reduce cost.

Configuration Example 3

One of two types of windings contained in one slot may be constituted by a segment coil. The one of the windings (winding constituted by the segment coil) may be contained in a central portion of one slot, and the other winding may be contained in both end portions of the one slot in the circumferential direction. For example, the other winding may be wound around the teeth by concentrated winding. With such a configuration, it is possible to shield (magnetically shield) the other winding contained in both end portions of the slot in the circumferential direction by using the one of the windings (that is, the segment coil) contained in the central portion of the slot in the circumferential direction. Thus, it is possible to improve the space factors of the windings in the slot. Moreover, it is possible to reduce the size of the coil end portion of the windings. Furthermore, it is possible to simplify an operation of winding wires, and therefore it is possible to reduce cost.

Configuration Example 4

One of two types of windings contained in one slot may be constituted by a segment coil. The slot may have a shape corresponding to the shape of the one of the windings constituted by the segment coil. For example, a part of the inner side surface of the stator core forming the slot (to be specific, the inner peripheral surface of the back yoke and side surfaces of the teeth in the circumferential direction) that is in contact with the one of the windings (that is, the winding that is constituted by the segment coil) may be a flat surface. With such a configuration, it is possible to improve the space factors of the windings in the slot.

Configuration Example 5

One of two types of windings contained in one slot may be constituted by a segment coil. The one of the windings (winding that is constituted by the segment coil) may be contained in a central portion of one slot in the circumferential direction. The slot may be formed in such a way that the two types of windings (in some cases, the two types of windings and accessory components such as an insulator) contained in the slot may not be accidentally removed from the opening of the slot. For example, the slot may be formed in such a way that the opening of the slot is narrower than the one of the windings (winding that is constituted by the segment coil) contained in a central portion of the slot in the circumferential direction. With such a configuration, it is possible to prevent accidental removal of the windings from the inside of the slot.

Configuration Example 6

When one of two types of windings is wound in a barrel-like shape around the teeth, the one of the windings wound in the barrel-like shape may collapse.

Therefore, the stator core or a winding-frame insulator may have a projection for preventing collapsing of the winding. With such a configuration, it is possible to prevent collapsing of the winding, and can improve the space factor of the winding in the slot.

Configuration Example 7

In general, a drive shaft usually has a shape such that a portion thereof outside (outside in the axial direction) of the point of application for supporting the drive shaft is thinner that a portion thereof inside (inside in the axial direction) of the point of application for supporting the drive shaft. Thus, the critical speed of the drive shaft tends to decrease.

Therefore, one of two types of windings may be constituted by a segment coil. The one of the windings (winding that is constituted by the segment coil) may be contained in the slot in such a way that one of two coil end portions of the one of the windings that is constituted by the segment coil, the one of the coil end portions being formed by welding (or by contact-bonding) (a coil end portion having a larger length in the axial direction), is positioned inside (inside in the axial direction) of the point of application for supporting the drive shaft. With such a configuration, it is possible to dispose the other of the two coil end portions of the one of the windings that is constituted by the segment coil, the other of the two coil end portions having a smaller length in the axial direction, outside (outside in the axial direction) of the point of application for supporting the drive shaft. Thus, it is possible to increase the critical speed of the drive shaft, and therefore it is possible to rotate the drive shaft at a high speed.

Regarding Configuration Examples 8 to 10

When two types of windings in which different electric currents flow are contained in one slot, it is necessary to electrically insulate the windings from each other in the one slot.

Configuration Example 8

Therefore, an insulator (insulating member) that electrically insulates the two types of windings contained in one slot from each other may be provided between the two types of windings. For example, after containing one of the two types of windings in the slot, the insulator may be disposed in the slot and one of the windings (the one of the windings that has been contained in the slot) may be fixed, and subsequently the other of the two types of windings may be contained in the slot. That is, one slot may be divided into two spaces by the insulator, and two types of windings may be respectively contained in the two spaces. With such a configuration, it is possible to electrically insulate two types of windings contained in one slot from each other. Moreover, it is possible to improve insulation workability.

Configuration Example 9

One of two types of windings contained in one slot may be constituted by a segment coil. Each of the two types of windings may be covered by an insulation coating. The thickness of the insulation coating of the one of the windings that is constituted by the segment coil may be larger than the thickness of the insulation coating of the other winding. With such a configuration, it is possible to electrically insulate the two types of windings contained in one slot from each other. Moreover, it is possible to improve insulation workability.

Configuration Example 10

One of two types of windings contained in one slot may be molded with an insulating material. For example, after containing one of the two types of windings in the slot, the one of the windings contained in the slot may be molded with an insulating material, and subsequently the other of the two types of windings may be contained in the slot (the slot in which the one of the windings that has been molded with the insulating material is contained). With such a configuration, it is possible to electrically insulate two types of windings contained in one slot from each other. Moreover, it is possible to efficiency in assembly of windings.

Configuration Example 11

When two types of windings that are connected to different power source circuits are contained in one slot, the reference potentials of the two types of windings differ from each other, and therefore the level of insulation protection of the two types of windings tends to increase.

Therefore, the two types of windings may be respectively connected to the power source circuits in such a way that the ground levels of the power source circuits, which are respectively connected to the two types of windings, coincide with each other. For example, when the two types of windings are a drive winding (that is, a drive electric wire, the same applies hereafter) and a support winding (that is, a support electric wire, the same applies hereafter), the neutral point of the drive winding may be connected to the neutral point of the support winding, the neutral point of the drive winding may be connected to the ground of a power source circuit (such as a power amplifier) connected to the support winding, the neutral point of the support winding may be connected to the ground of a power source circuit (such as an inverter) connected to the drive winding, or the ground of the power source circuit connected to the drive winding may be connected to the ground of the power source circuit connected to the support winding. With such a configuration, it is possible to reduce the potential difference between two types of windings contained in one slot. Thus, it is possible to decrease the level of insulation protection of two types of windings.

Configuration Example 12

When two types of windings are contained in one slot, one of the two types of windings that has been contained in the slot may be damaged by the other winding that is being contained in the slot.

Therefore, an insulator (insulating member) for protecting one of the two types of windings that has been contained in the slot may be disposed in the slot. The insulator may be a plate-shaped member that can be bent in a U-shape. For example, after containing one of two types of windings in both end portions of the slot in the circumferential direction, the insulator may be disposed in the slot in such a way that the opening of the slot is closed by a bottom portion (bottom portion of the U-shape) of the insulator and a central portion and both end portions of the slot in the circumferential direction are separated from each other by a pair of linear portions (linear portions of the U-shape) of the insulator, and subsequently the other of the two types of windings may be contained in the central portion in the circumferential direction of the slot (a space that is separated by the insulator from both end portions of the slot in the circumferential direction). With such a configuration, it is possible to prevent damage to a winding in the slot (damage to one of the two types of windings that has been contained in the slot caused by the other winding that is being contained in the slot). Moreover, it is possible to close the opening of the slot with the insulator, and therefore it is possible to prevent accidental removal of the winding from the slot.

Configuration Example 13

When two types of windings are contained in one slot, the size of a coil end may increase due to overlapping of jumpers of the two types of windings.

Therefore, two types of windings may be contained in both end portions of one slot in the circumferential direction, and the jumpers of the two types of windings may be pulled out in directions in which tension is applied to the teeth. For example, when the slot is seen from the central axis of the stator in a state in which the central axis of the stator is oriented in the up-down direction, one of the windings may be contained in a right end portion of the slot and the jumper of the one of the windings may be pulled out rightward, and the other winding may be contained in a left end portion of the slot and the jumper of the other winding may be pulled out leftward. With such a configuration, it is possible to prevent interference between the jumpers of two types of windings while applying tension to the teeth. Thus, it is possible to improve the space factors of the windings in the slot. Moreover, it is possible to reduce the size of the coil end portion of the windings.

Configuration Example 14

In general, it is usually difficult to increase the diameter of a portion of the drive shaft outside (outside in the axial direction) of the bearingless motor. Thus, the critical speed of the drive shaft tends to decrease.

Therefore, a reinforcement sleeve may be provided in a portion of the drive shaft outside (outside in the axial direction) of the bearingless motor. For example, the reinforcement sleeve may be shrink-fitted to the portion of the drive shaft outside (outside in the axial direction) of the bearingless motor. Preferably, the reinforcement sleeve is made of a non-magnetic material (such as stainless steel). A position sensor (such as a displacement sensor) may be disposed so that the reinforcement sleeve can be detected by the position sensor. With such a configuration, it is possible to increase the critical speed of the drive shaft, and therefore it is possible to rotate the drive shaft at a high speed. By forming the reinforcement sleeve from a non-magnetic material, the displacement sensor can be protected against noise.

Regarding Configuration Examples 15 and 16

When a disk portion of the drive shaft (a portion supported by the thrust magnetic bearing in a non-contact manner) is provided at a central portion of the drive shaft in the axial direction, the shaft length of the drive shaft is increased, and the critical speed of the drive shaft is reduced. Moreover, it is difficult to remove the drive shaft, and therefore it is difficult to perform maintenance of the drive shaft.

Configuration Example 15

Therefore, the diameter of a portion (one end portion in the axial direction) of the drive shaft coupled to the impeller (compression mechanism) may be smaller than the diameter of a portion of drive shaft that is supported by the bearingless motor in a non-contact manner. The disk portion of the drive shaft (a portion supported by the thrust magnetic bearing in a non-contact manner) may be provided at a portion where the diameter of the drive shaft changes (a portion from which the diameter of the drive shaft decreases). With such a configuration, it is possible to reduce the shaft length of the drive shaft. Thus, it is possible to increase the critical speed of the drive shaft, and therefore it is possible to rotate the drive shaft at a high speed. Moreover, it is easy to remove the drive shaft, and therefore it is easy to perform maintenance of the drive shaft.

Configuration Example 16

In the configuration example 15 described above, the stator of the thrust magnetic bearing may have a function of a cover (wall portion) that separates an impeller chamber, in which the impeller (compression mechanism) is contained, and an electric motor chamber, in which the bearingless motor is contained, from each other. A sealing member that seals the impeller chamber and the electric motor chamber may be provided on the inner periphery of the stator of the thrust magnetic bearing.

Configuration Example 17

When two bearingless motors are simply provided, the size of the coil end portions of the bearingless motors is twice as large as that of a case where one bearingless motor is provided. Therefore, the shaft length of the drive shaft may increase, and the critical speed of the drive shaft may decrease. Moreover, when the windings of the two bearingless motors are simply coupled, the support-to-support distance of the drive shaft (the distance between the two bearingless motors) is small, and it may become difficult to control the moment of the drive shaft around the center of gravity.

Therefore, an ordinary electric motor (electric motor that does not have a non-contact support function) may be disposed between the two bearingless motors in the axial direction of the drive shaft, and the windings of the two bearingless motors and the winding of the ordinary electric motor may be integrated with each other by using a segment coil. With such a configuration, it is possible to halve the size of the coil ends of the two bearingless motors compared with a case where the two bearingless motors are simply provided, and therefore it is possible to reduce the shaft length of the drive shaft. Thus, it is possible to increase the critical speed of the drive shaft, and therefore it is possible to rotate the drive shaft at a high speed.

Configuration Example 18

When the rotations of the rotors of two bearingless motors become out of phase, it may become difficult to control (the rotation and the position) of the drive shaft.

Therefore, a positioning mechanism may be provided. For example, the stator may have a key, a key groove, a knock pin, and the like; and the permanent magnet of the rotor may protrude slightly toward the pin. With such a configuration, it is possible to suppress the rotations of the rotors of the two bearingless motors from becoming out of phase.

Regarding Configuration Examples 19 and 20

When two bearingless motors are placed in a casing, in general, from the viewpoint of workability, a lead-wire connecting portion may be provided outside (outside in the axial direction) of the two bearingless motors. However, with such a configuration, the length of a portion of the drive shaft outside (outside in the axial direction) of the point of application for supporting the drive shaft is increased, and therefore the critical speed of the drive shaft decreases.

Configuration Example 19

Therefore, a busbar (electric wire passage) for connection and a connector may be provided in a central portion (a central portion in the axial direction) of the casing, segment coils may be used as the windings of the bearingless motors so that the lead wire positions can be correctly determined and connectors may be provided, and these may be joined during assembly. With such a configuration, it is easy to perform assembly and wiring operations. Moreover, it is possible to increase the critical speed of the drive shaft, and therefore it is possible to rotate the drive shaft at a high speed.

Configuration Example 20

A busbar and a connector may be provided in a housing (or a component that fixes the housing) of the thrust magnetic bearing provided in a central portion (a central portion in the axial direction) of the casing. With such a configuration, it is easy to perform assembly and wiring operations. Moreover, it is possible to increase the critical speed of the drive shaft, and therefore it is possible to rotate the drive shaft at a high speed.

Configuration Example 21

When two types of windings are contained in one slot, the space factor of the windings in the slot tends to increase. Moreover, the size of the coil end portions of the two types of windings contained in one slot tends to increase. Therefore, it may be difficult cool the windings in the slot.

Therefore, a through-hole that allows a refrigerant to flow therethrough may be formed in the back yoke of the stator of the bearingless motor. With such a configuration, it is possible to cool the two types of windings contained in one slot. Moreover, it is possible to increase the electric current density, and therefore it is possible to improve the performance (torque and supporting force) with the same size.

The embodiments and the modifications described above may be carried out in any appropriate combinations. The embodiments and the modifications described above are preferred examples, and are not intended to limit the invention, the applications thereof, and the range of use thereof.

INDUSTRIAL APPLICABILITY

As heretofore described, the present disclosure is useful for an electric motor.

REFERENCE SIGNS LIST 10 turbo-compressor
11 casing
12 drive shaft
13 impeller
20 bearingless motor (electric motor)
30 rotor
40 stator
50 stator core
51 back yoke
52 teeth
53 slot
60 support electric wire
61 conductive wire
65 coil end portion
70 drive electric wire
71 conductive wire
75 coil end portion
80 segment coil
81 coupling member

What is claimed is:

1. An electric motor comprising:
   a rotor; and
   a stator, the stator including
   a stator core that includes a back yoke having an annular shape and a plurality of teeth provided on an inner periphery of the back yoke,
   a support electric wire formed by a bundle of conductive wires, the support electric wire
   being disposed so as to pass through a plurality of slots respectively formed between the plurality of teeth, and
   forming a winding portion that generates an electromagnetic force for supporting the rotor in a non-contact manner by being energized, and
   a drive electric wire formed by a bundle of conductive wires, the drive electric wire
   being disposed so as to pass through the plurality of slots, and
   forming a winding portion that generates an electromagnetic force for rotating the rotor by being energized,
   a cross-sectional area per conductive wire of the conductive wires in the bundle forming one of the support electric wire and the drive electric wire is smaller than a cross-sectional area per conductive wire of the conductive wires in the bundle forming the other of the support electric wire and the drive electric wire, and
   the bundle forming the one of the support electric wire and the drive electric wire including a larger number of conductive wires than the bundle forming, the other of the support electric wire and the drive electric wire.

2. The electric motor according to claim 1, wherein
   a ratio of a sum of cross-sectional areas of the conductive wires thereof that pass through each of the slots to a cross-sectional area of the slot is smaller for the bundle forming, the one of the support electric wire and the drive electric wire than for the bundle forming the other of the support electric wire and the drive electric wire.

3. The electric motor according to claim 1, wherein
   a sum of cross-sectional areas of the conductive wires of the bundle forming the one of the support electric wire and the drive electric wire is smaller than a sum of cross-sectional areas of the conductive wires of the bundle forming the other of the support electric wire and the drive electric wire.

4. The electric motor according to claim 1, wherein
   at least the support electric wire includes plurality of support electric wires and a number of the plurality of support electric wires is larger than a number of the drive electric wire, or
   at least the drive electric wire includes a plurality of drive electric wires and a number of the plurality of drive electric wires is than ager number of the support electric wire.

5. The electric motor according to claim 1, wherein
   the cross-sectional area per conductive wire of the bundle forming the support electric wire is smaller than the cross-sectional area per conductive wire of the bundle forming the drive electric wire.

6. The electric motor according, to claim 1, wherein
   a part or an entirety of a coil end portion of the one of the support electric wire and the drive electric wire is covered by a part or an entirety of a coil end portion of the other of the support electric wire and the drive electric wire.

7. The electric motor according to claim 6, wherein
   the other of the support electric wire and the drive electric wire is formed by a segment coil.

8. The electric motor according to claim 1, wherein
   the support electric wire and the drive electric wire are disposed adjacent to each other in a circumferential direction of the stator.

9. The electric motor according to claim 8, wherein
   the support electric wire and the drive electric wire are disposed in such a way that
   a part or an entirety of the one of the support electric wire and the drive electric wire is covered by a part or an entirety of the other of the support electric wire and the drive electric wire.

10. A turbo-compressor including the electric motor according to claim 1, the turbo compressor further comprising:
    a drive shaft rotated by the electric motor; and
    an impeller coupled to the drive shaft.

11. The electric motor according to claim 2, wherein
    the cross-sectional area per conductive wire of the bundle forming the support electric wire is smaller than the cross-sectional area per conductive wire of the bundle forming the drive electric wire.

12. The electric motor according to claim 2, wherein
    a part or an entirety of a coil end portion of the one of the support electric wire and the drive electric wire is covered by a part or an entirety of a coil end portion of the other of the support electric wire and the drive electric wire.

13. The electric motor according to claim 3, wherein
    the cross-sectional area per conductive wire of the bundle forming the support electric wire is smaller than the cross-sectional area per conductive wire of the bundle forming, the drive electric wire.

14. The electric motor according to claim 3, wherein
    a part or an entirety of a coil end portion of the one of the support electric wire and the drive electric wire is covered by a pan or an entirety of a coil end portion of the other of the support electric wire and the drive electric wire.

15. The electric motor according to claim 4, wherein
    the cross-sectional area per conductive wire of the bundle forming; the support electric wire is smaller than the cross-sectional area per conductive wire of the bundle forming the drive electric wire.

16. The electric motor according to claim 4, wherein
    a part or an entirety of a coil end portion of the one of the support electric wire and the drive electric wire is covered by a part or an entirety of a coil end portion of the other of the support electric wire and the drive electric wire.

17. The electric motor according to claim 1, wherein
    the one of the support electric wire and the drive electric wire is disposed radially outward relative to the other of the support electric wire and drive electric wire.

18. The electric motor according to claim 17, wherein
    the support electric wire includes a plurality of support electric wires, and
    the drive electric wire includes a plurality of drive electric wires.

19. The electric motor according to claim 18, wherein
    the plurality of support electric wires is disposed radially outward relative to the plurality of drive electric wires.

20. The electric motor according to claim 1, wherein
    at least two of the conductive wires in the bundle forming the support electric wire are disposed adjacent to each other in a circumferential direction of the stator, and at least two of the conductive wires in the bundle forming the drive electric wire are disposed adjacent to each other in a circumferential direction of the stator.

21. The electric motor according to claim 1, wherein the one of the support electric wire and the drive electric wire having a smaller space factor than the other of the support electric wire and the drive electric wire.

22. The electric motor according to claim 8, wherein the support electric wire includes a plurality of support electric wires disposed along a radial direction of the stator, and
the drive electric wire includes a plurality of drive electric wires disposed along the radial direction of the stator,
the plurality of support electric wires and the plurality of drive electric wires being disposed adjacent to each other in the circumferential direction of the stator.

\* \* \* \* \*